(12) United States Patent
Feng et al.

(10) Patent No.: US 7,739,602 B2
(45) Date of Patent: Jun. 15, 2010

(54) SYSTEM AND METHOD FOR COMMUNITY CENTRIC RESOURCE SHARING BASED ON A PUBLISHING SUBSCRIPTION MODEL

(75) Inventors: Andrew Feng, Cupertino, CA (US); Atul Bhandari, Sunnyvale, CA (US); Valerie Kucharewski, San Jose, CA (US)

(73) Assignee: AOL Inc., Dulles, VA (US)

( * ) Notice: Subject to any disclaimer, the term of this patent is extended or adjusted under 35 U.S.C. 154(b) by 1099 days.

(21) Appl. No.: 10/606,021

(22) Filed: Jun. 24, 2003

(65) Prior Publication Data
US 2004/0267625 A1 Dec. 30, 2004

(51) Int. Cl.
*G06F 3/00* (2006.01)
(52) U.S. Cl. .................. 715/733; 715/780; 715/781; 709/201; 709/202; 709/203
(58) Field of Classification Search ............... 715/780, 715/739, 781, 733; 709/201, 202, 203
See application file for complete search history.

(56) References Cited

U.S. PATENT DOCUMENTS

| | | | |
|---|---|---|---|
| 6,269,369 B1 * | 7/2001 | Robertson | 707/10 |
| 6,751,626 B2 * | 6/2004 | Brown et al. | 707/101 |
| 6,820,204 B1 * | 11/2004 | Desai et al. | 726/6 |
| 2001/0027472 A1 * | 10/2001 | Guan | 709/203 |
| 2002/0023132 A1 * | 2/2002 | Tornabene et al. | 709/205 |
| 2002/0049751 A1 * | 4/2002 | Chen et al. | 707/3 |
| 2002/0104021 A1 | 8/2002 | Gross | 713/201 |
| 2002/0116506 A1 | 8/2002 | Lautner | 709/229 |
| 2002/0147777 A1 | 10/2002 | Hackbarth et al. | 709/205 |
| 2002/0156895 A1 * | 10/2002 | Brown | 709/226 |
| 2002/0166117 A1 | 11/2002 | Abrams et al. | 717/177 |

(Continued)

FOREIGN PATENT DOCUMENTS

EP  1 168 167  1/2002

(Continued)

OTHER PUBLICATIONS

Hu, titled Yahoo adds spam filter to email, but will it work?, published on Jan. 2, 2002, pp. 1-2.*

(Continued)

*Primary Examiner*—Weilun Lo
*Assistant Examiner*—Tuyetlien T Tran
(74) *Attorney, Agent, or Firm*—Michael A. Glenn; Glenn Patent Group

(57) ABSTRACT

The invention provides a Web service which enables a publisher to share his digital resources such as an address card or a calendar with a number of subscribers based on different sharing relationships. The Web service includes a host-based interface called "My Community", for example, with which the publisher manages the share-relationships with his community members. The community members are organized into different groups. Each group includes a number of community members who have a common sharing relationship with the publisher with respect to one or more views of the shared resources. A resource may have multiple views. Each of the views has Metadata describing sharing-styles, as well as version, creation date, size, and the like. Each sharing style corresponds to a specific sharing relationship between a community member and the publisher.

89 Claims, 30 Drawing Sheets

U.S. PATENT DOCUMENTS

2002/0184624 A1 12/2002 Spencer ............... 725/39
2003/0069874 A1* 4/2003 Hertzog et al. ............. 707/1
2006/0027648 A1* 2/2006 Cheah ................. 235/381

FOREIGN PATENT DOCUMENTS

GB      2 364 474      1/2002

OTHER PUBLICATIONS

Padwick et al, ebook titled "special edition using Microsoft Outlook 2000" published on May 12, 1999, pp. 1-3.*

Slipstick, titled "To add addresses automatically", published Jun. 7, 2002, pp. 1-2.*

Microsoft TechNet, titled "Microsoft Office 2003 Editions Security Whitepaper", published on Apr. 1, 2003, pp. 1-2.*

Padwick, "special edition using Microsoft Outlook 2000", published May 12, 1999, pp. 1-4.*

Novelty Search Results, Apr. 2003.

"Update Your Address Book"; www.plaxo.com.

"Product Overview"; www.plaxo.com.

"Company Overview"; www.plaxo.com.

"Management team"; www.plaxo.com.

"Plaxo Launches; Makes It Easy to Keep Contact Information"; www.plaxo.com.

* cited by examiner

SYSTEM AND METHOD FOR COMMUNITY CENTRIC RESOURCE SHARING BASED ON A PUBLISHING SUBSCRIPTION MODEL

BACKGROUND OF THE INVENTION

1. Technical Field

The invention relates generally to Internet based information sharing technology. More particularly, this invention relates to a system and method for providing a scheme for dynamic Web service which enables registered users to interactively share their digital resources with other registered users and non-registered users based on categorized sharing relationships with respect to different views of the digital resources.

2. Description of the Prior Art

The development of Internet technology has provided a vast new world of resource sharing. Digital files, such as text, photos, and audio/video programs, can be shared with almost any number of designated recipients in just a few seconds via e-mail. News, magazines and other resources can be digitally delivered from a central repository to many users based on subscription policies. Internet service providers now provide group e-mail services in which a registered user subscribes a service or services in connection with a specific group or several groups. Some other companies provide Internet based solutions to automatically update address book or contact information.

One such service, for example, is "Yahoo! Group" (http://groups.yahoo.com/), which provides an easy way for groups of people to communicate on the Internet—discussing sports, health and current events with a group of people, sharing photos and files, planning events, sending newsletters; and staying in touch with friends and family. To start a group, the user needs first to select a "Yahoo! Groups Category" by browsing or searching for the category that best describes his group. Then, the user needs to describe his group. This includes giving a "group name"; entering the group's e-mail address and giving a brief description about the group. When the user sends a message to the group e-mail address, all members of this group receives a copy of the message. A recipient of the message can unsubscribe from the group messages by returning an e-mail or clicking a URL embedded in the message.

Plaxo, Inc. (www.plaxo.com), for example, has developed an address book updating application which enables a user to automatically update his address books. Immediately after the user downloads the application, he is prompted to choose which people from his address book he wants to get updated contact information from. The user may choose as many people as he likes. The application then, on behalf of the user, sends out a simple message to each of the selected people, showing the contact information the user currently has in his address book on them and requesting them to correct the out-of-date information. The replies to these e-mails are processed by the application and automatically inserted into the user's address book. The user receives notifications from Plaxo as the updates replies come in. The user can also use Plaxo to send his own updated contact information to the selected people in his address book. Plaxo allows the user to create two cards, i.e. a business card and a personal card, so that the user can offer different information to different people. Once the user creates his cards, he can send them to anyone in his address book. If they are not Plaxo members, they will receive an e-mail containing the user's card. If they are Plaxo members and the user is in their address books, they receive a message asking them if they want to add the user. As friends and contacts join Plaxo, the user is automatically kept up-to-date without e-mails. The user's address book is automatically updated with the latest contact information of his friends and contacts that join Plaxo. This synchronization happens automatically on a daily basis as long as Outlook is running. The major weakness of Plaxo's solution is that until people download and use Plaxo, requests for contact information arrive in the form of e-mail, which may be construed as spam because it simply asks people for their information.

GoodContacts (www.goodcontacts.com) provides a solution to help a user to send a short e-mail message to the people that the user selects in his address book for verification. The e-mail incorporates a snapshot of the business card information the user has about them and asks them to review that information, make sure it is accurate, change it if it is wrong, and add anything that is missing. When they do so, the GoodContacts software updates the user's address book with the new information automatically. The user has the control to select the contacts he wants to verify. No e-mails are sent by the GoodContacts software without the user actively choosing to do so. To personalize the GoodContacts e-mails to be sent out, the user can choose to use the text in one of the standard templates that comes with the software, or he can personalize the message and subject header to his taste. He can also purchase a customized template that incorporates his or an organization's logo and colors in every keep-in-touch e-mail he sends. The GoodContacts software currently interfaces with Outlook, Outlook Express and ACT!. It does not store users' address books and thus unauthorized persons cannot access a user's address book and send spam to the user's contacts. The major weakness of the GoodContacts solution is its lower level automation because it has a very complicated setting feature, offering a suite of options for frequency of update requests, privacy settings, and sending requests to alternate e-mail addresses. Further, like Plaxo, until people download and use the software, requests for contact information arrive in the form of e-mail, which may be treated as spam.

AddresSender (www.addressender.com) is a Web-based anywhere-accessible address book service that offers automatic updates within their network as well as synchronization capability with desktop PIMs. It forms links between one user and other AddresSender users to create a network and automatically sends and receives updates within the network. AddresSender's address book synchronizes with the user's Outlook (or OE or ACT!) contact list. It enables the user to send his information to his contacts. The user's in-network contacts get updates automatically; others get e-mails or even physical postcards. Unlike Plaxo and GoodContacts, AddresSender does not automatically import contact information for anybody except other users in the AddresSender network.

CardScan (www.cardscan.com/accucard) offers scanners and text-recognition software for transferring business cards into the user's electronic address book. The software is bundled with AccuCard Service with a functionality to confirm the accuracy of contact information and keep the user's entire address book up-to-date automatically. Like Plaxo, the AccuCard Service stores address information on a central server. On a quarterly basis, the AccuCard asks the user's contacts to confirm or update their information. It reminds the user whether a contact in his address book is out-of-state (i.e. if there is new information for that contact on the AccuCard server). The user must view the updates and accept or reject the changes for that contact. AccuCard allows the user to choose whether to reveal his identity or include a personal message with requests for updates. It stores images of business cards as well as the information therein.

CardScan is compatible with Microsoft Outlook, ACT!, Lotus Notes, and over 30 more contact managers. It synchronizes with any Palm, Handspring or Sony handheld, most Pocket PCs and the web. No matter where the user keeps his contact information, it can be up-to-date all the time. The primary weakness of this system is in privacy and control. For example, few controls are offered for distribution of information. Data need not originate with the contact himself, and updates are distributed to anyone who held the card originally. Update requesters need not reveal their identities though CardScan recommends that disclosing the requestor's name yields a better response rate. While this may be effective for a business application, it is not conducive to sharing personal information.

Now-defunct Ants.com developed a product called Scout for keeping address books up-to-date. It stores a user's "business card" information in a central database, and other Scout users who have that user's e-mail address could get the user's latest information automatically. Based on the e-mail address a user has, Scout automatically fills and automatically updates the user's Outlook address book with information from its database. Like several other products, Scout offers to send invitations for the user's other contacts to join. The critical weakness in Scout's model is that, although some limited restrictions can be set, it allows anyone with the user's e-mail address to get the rest of the data from the user's business card.

The approaches introduced above have many problems. For example, if a user wants to have a multiple-group sharing business, he has to set up many different groups manually and he has to spend a lot of time to manage these groups. For another example, if the user wants to send different views of a shared resource to different groups, he has to create different versions of the resource and send different versions to different groups manually. Further, when the shared resource is updated, the local copies cannot be automatically updated. Furthermore, the group members cannot interactively share a centric resource such as a calendar.

What is desired is a universal sharing scheme that includes the following features:
  A convenient easy-to-use publishing subscription model for sharing, which puts a publisher in control about whom to share the resources and thus reduce privacy concerns;
  A "My Community" centric management system, with which the publisher shares his resources with his own community only and, at the same time, his community is dynamically extended by accepting non-members to join;
  A mechanism of multiple views based sharing, which enables the publisher to share different views of a shared resource and thus further reduces the privacy concerns;
  A mechanism for automatically updating the shared resource within "My Community";
  A flexible sharing model, with which different sharing relationships for different needs are defined; and
  A mechanism for integration of agents as sharing facilitators which enables the sharing process to be automated whenever possible and enables different applications to provide sharing functions.

SUMMARY

This invention provides a Web service which enables a publisher to share his digital resources with a number of subscribers based on different sharing relationships. The Web service includes an interface called "My Community", for example, with which the publisher manages the sharing relationships with his community members. In a preferred embodiment of this invention, a community member refers to a user in a UNIX or any computer system who has an account with the system. The community members are organized into different groups. Each group includes a number of community members who have a common sharing relationship with the publisher with respect to one or more views of the shared resources. A resource may have multiple views, such as "full view" v. "basic view" v. "professional view" of a digital address card, or "normal view" v. "personal view" v. "confidential view" of a calendar. Each of the views has Metadata describing sharing styles, as well as version, creation date, size, and the like. Each sharing style corresponds to a specific sharing relationship between a community member and the publisher.

In an equally preferred embodiment, an address card service is incorporated with the existing address book technology, which enables automatic sharing and updates of address book information. Members, i.e. registered users, can share ("publish") personal contact information, work information or/and personal notes with the people they want to stay in touch with. Those members can "subscribe" to automatically receive changes when the information is updated. The address card provides a link between members to help them stay in touch, and to keep their address books up-to-date with all the right information. The service ensures that the members always have the right contact information for their friends and family whenever they need it.

The address book is a central way for the user to share personal information and automatically keep it up-to-date. All his friends and family can always have his current contact information whenever he updates it and he never has to worry about mistyping a friend's new phone number or e-mail address to copy it into his address book because they can share it with him automatically.

Members can easily create an address card of personal and contact information. Even they can include self-expression elements such as Buddy Icon, personal/business logo, stationery, etc. Further, the member can create his address cards with different views for different audiences.

Members can share a personal address card with designated others. Sharing may take place via e-mail or a one-click communication mechanism. They can share an address card with all or part of the address book/"buddy list", leveraging the groups and categories of people in those lists. They can also share an address card with recipients of mail messages. They can even make an address card "public," open to subscription by any member.

Members with whom an address card is shared can accept the card to add that information to their address book. They receive automatic updates when the card is modified. They can choose to automatically accept address cards from contacts already in their address book or "buddy list" or contacts with whom they have shared. Where possible, address cards are resolved with existing entries in the subscriber's address book, using screen name and other key fields to detect duplicates.

A member can share his address card with another member (e.g. via Member Directory, Buddy Info). When a subscriber accepts, it is easy to reciprocate with a share.

When a member updates his address card, the modification is automatically reflected for subscribers with whom it is shared so that information is always up-to-date. It may include options to unsubscribe automatic updates on the publisher or subscriber side. It may also include an option to notify subscriber of updates so that new information is not missed.

Once a member has subscribed to an address card, the address card's information is available wherever the address book information is accessed. The subscriber may make edits to the local copy of the address card, but any edits are overwritten if the publisher updates the address card because the publisher's address card always contains the most up-to-date information.

The member's privacy is always protected. Policy for forwarding (i.e. passing on) another member's address card will limit or restrict the ability for forwarded cards to maintain subscriptions to the original card; original publisher must grant permission. Forwarding an invitation to request an address card affords the most control and privacy while still enabling the spread of address cards.

While the address card works best among registered members, it still supports sharing with non-members through export of standard contact card formats for a seamless sharing experience. Publishing to non-members includes e-mail based updates for published modifications.

A similar mechanism can enable sharing among a group, such as a Family, to which members can easily publish and subscribe to share updates among all members of the group.

The address card and group sharing models may be applied for sharing other member-created information and lists, such as "favorite place" and "buddy list".

The address card system disclosed herein has numerous advantages. For example: the publisher is in control of who receives which view of the address card; users have flexible preferences for automatically publishing or automatically subscribing address cards; unlike any prior art system which focuses on a "pull" model of soliciting other users' contact information, the address card system taught herein focuses on a "push" model of sharing publishers' information, allowing recipients to simply accept; it propagates automatic updates within an existing network of registered users; furthermore, it enables the users to easily choose groups or categories with which to share.

DETAILED DESCRIPTION OF THE INVENTION

The invention provides a Web service which enables a registered member, called a publisher, to share his digital resources, such as his address card or his calendar, with a number of subscribers based on different sharing relationships. The Web service includes a user interface, called "My Community" for example, with which the publisher manages the share-relationships with his community members. In the preferred embodiment of this invention, a community member refers to a registered user in a UNIX or any computer system who has an account in the system. The community members are organized into different groups. Each group includes a number of community members who have a common sharing relationship with the publisher with respect to one or more views of the resources. A resource may have multiple views, such as "full view" v. "basic view" v. "professional view" of an address card, or "normal view" v. "personal view" v. "confidential view" of a calendar. Each of the views has Metadata describing sharing-styles, as well as version, creation date, size, and the like. Each sharing style corresponds to a specific sharing relationship between a community member and the publisher.

Figure 1:
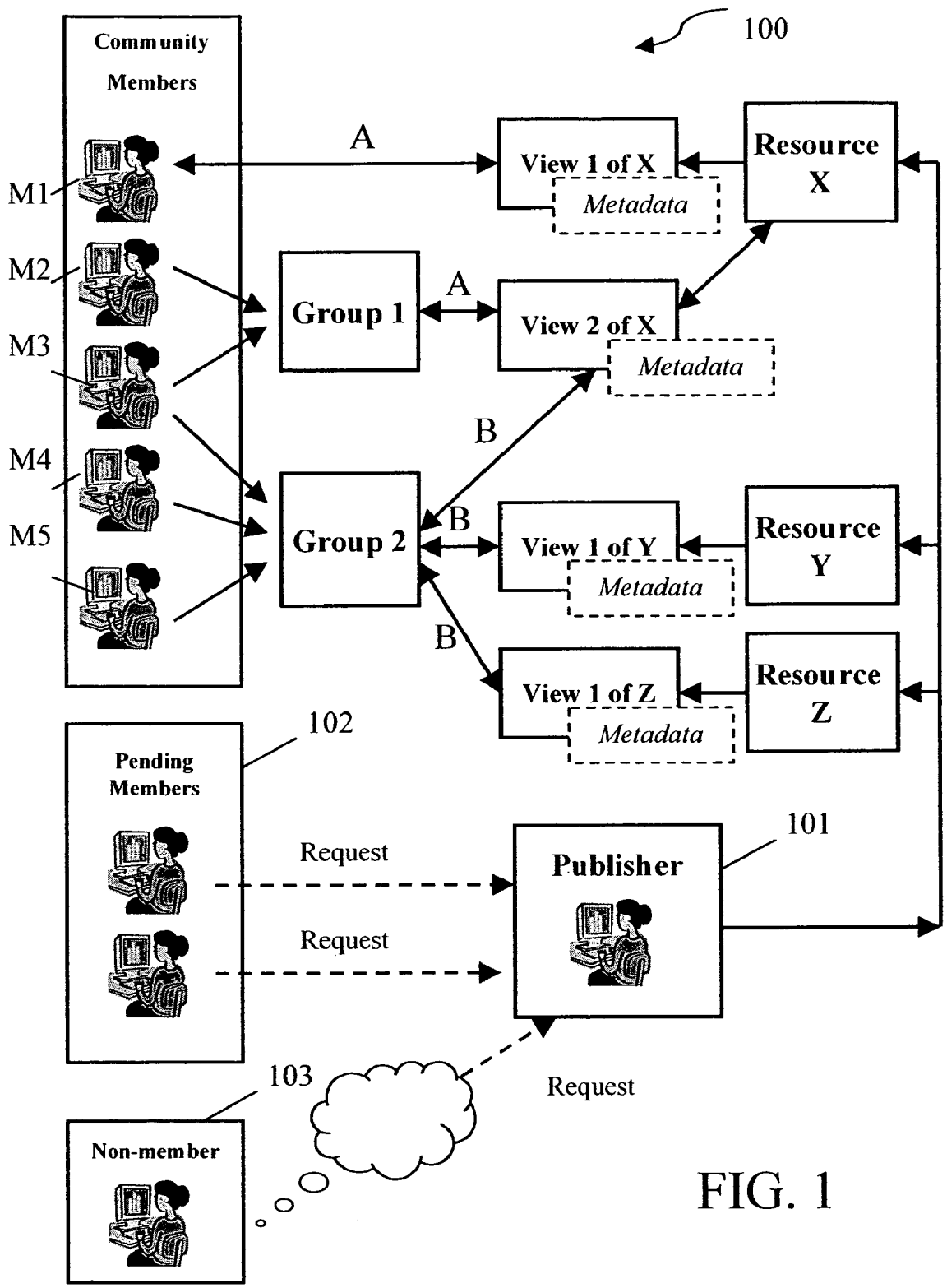
FIG. 1 is a schematic diagram illustrating an exemplary data model for a publisher's "My Community" according to this invention.

FIG. 1 is a schematic diagram illustrating an exemplary data model 100 for a publisher's "My Community". In this model, the publisher 101 has three resources, i.e. "Resource X", "Resource Y" and "Resource Z". "Resource X" has two views, i.e. "View 1 of X" and "View 2 of X". With respect to "View 1 of X", there is only one member, i.e. M1, under sharing relationship "A". However, with respect to "View 2 of X", "Group 1", which includes two members M2-3, is under sharing relationship "A", and "Group 2" which includes three members M3-5, is under sharing relationship "B". Note that a member can belong to different groups at the same time. For example, M3 belongs to both Group 1 and Group 2. After receiving the availability announcement from the publisher 101, the registered members 102 of the Web service who have not been designated as members of "My Community" send their subscription requests to the publisher 101. The non-members 103 who have not been registered with the Web service but have known the availability of the publisher's resource may also send their subscription requests to the publisher 101.

A sharing relationship defines what and how a specific group of community members can do on the shared resource during the life-span, i.e. the duration, of the sharing relationship. The life span may be "one-time only" or "ongoing". The following are three exemplary sharing relationships:

Copy_send—a group of community members access a predefined view of a resource by receiving a copy of the view from a publisher. For example: assuming sharing relationship "A" is "Copy_send", M1 receives a copy of "View 1 of X"; the Group 1 members (M2 and M3) receive a copy of "View 2 of X".

Reference_read—the group of community members read a shared resource in a central repository such as a picture album or a calendar. For example: assuming sharing relationship "B" is "Reference_read", the Group 2 members (M3, M4, and M5) can read "View 2 of X", "View 1 of Y" and "View 1 of Z".

Reference_write—the group of community members write/update a shared resource. For example: Assuming the sharing relationship "A" is "Reference_write", the Group 1 members (M2 and M3) can update "View 2 of X".

Figure 2A:
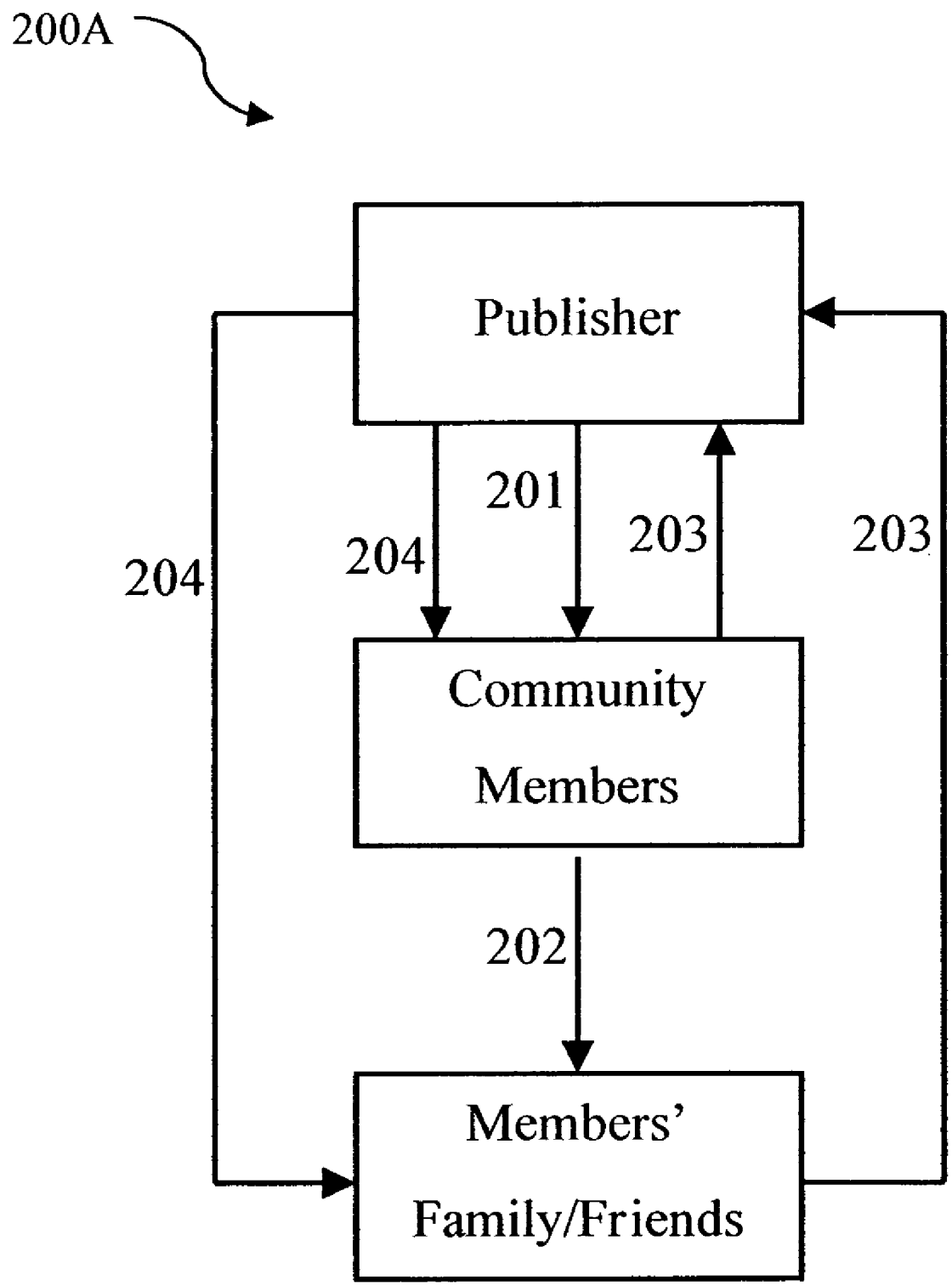
FIG. 2A is a flow model illustrating a process for resource sharing.

FIG. 2A is a flow model illustrating a process for resource sharing 200A which includes four basic steps:

Step 201: The publisher publishes an announcement to his community members;

Step 202: The community members forward the announcement to their family members or friends;

Step 203: Some community members and some non-members (i.e. member's family and friends) send subscription requests to the publisher; and Step 204: The publisher approves the subscription requests.

Figure 2B:
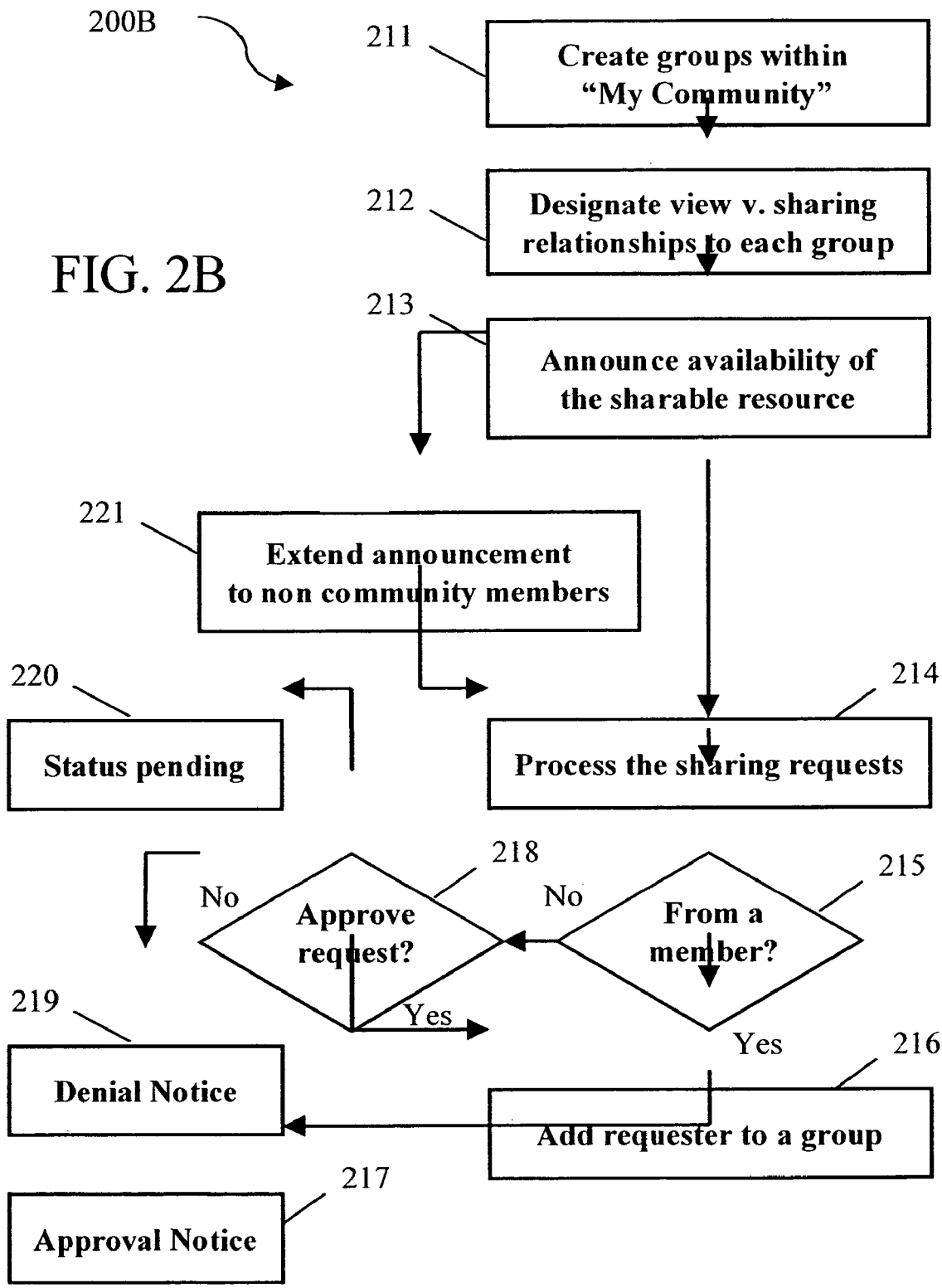
FIG. 2B is a flow diagram illustrating a process for resource sharing.

FIG. 2B is a flow diagram illustrating a process 200B for resource sharing, which includes the following steps:

Step 211: Create a number of groups inside "My Community". The number of members in each of the groups may start with zero initially.

Step 212: Designate a view of a sharable resource to some or all groups based on sharing relationships.

Step 213: Announce the availability of the views of the sharable resource and the sharing relationships to some or all of the publisher's community members.

Step 214: Process subscription requests. The requests are classified into different categories such as one-time sharing, on-going sharing and the like.

Step 215: Check whether the requester is a community member. If the requester is a community member, automatically approve the request.

Step 216: Add the requester to a group or groups.

Step 217: Notify the requester that his request has been approved.

Step 218: If the requester is not a community member, determine whether to approve the request. If yes, continue on Step 216.

Step 219: If the request is denied, send a denial notice.

Optionally, the process may further include Step 220 to hold the status pending.

Note that the publisher's "My Community" is dynamically extended because the existing community members spread the resource sharing announcements to non community members such as friends and family members. This is illustrated by Step 221. When a non community member submits his subscription request, his identity information such as name, e-mail address and his relationship with referral members should also be provided.

Under an ongoing type sharing relationship, whenever a shared resource is modified, community members' local copies are updated accordingly. In particular, the publisher first sends a change notification to the members who subscribed to the ongoing type relationship. In one option, a subscriber's local copy of the shared resource is automatically updated. In another option, when a subscriber receives the change notification, he can choose to update the local copy, not update, or choose to block future notification. In case he chooses to block future notification, the sharing relationship is modified on the publisher's side and thus the subscriber will no longer receive the change notification.

As mentioned above, the sharing relationships are managed via both the publisher's side and the subscriber's side. On the publisher's side, he can set the sharing preferences as to the groups that a resource should be shared with and relationships that should be applied for each group. The factors concerning the sharing relationship for each resource may include the groups/members that the resource is being shared with, current sharing relationship, life-span of the relationship (ongoing or one-time), status, and rejected sharing requests. For the publisher's community management, the system maintains a list of community members and their groups, a list of pending members and a list of rejected members. On the subscriber's side, he can set the sharing preferences as to the types of announcements that should be rejected and publishers from whom publishing is automatically applied after receiving an announcement. For example, the subscriber may set to block spam and set to automatically update the local copy of some resources upon receipt of the update notification. The factors concerning the sharing relationship for each resource may include a list of resources received, current sharing relationship, life-span of the relationship (ongoing or one-time) and status.

Figure 3:
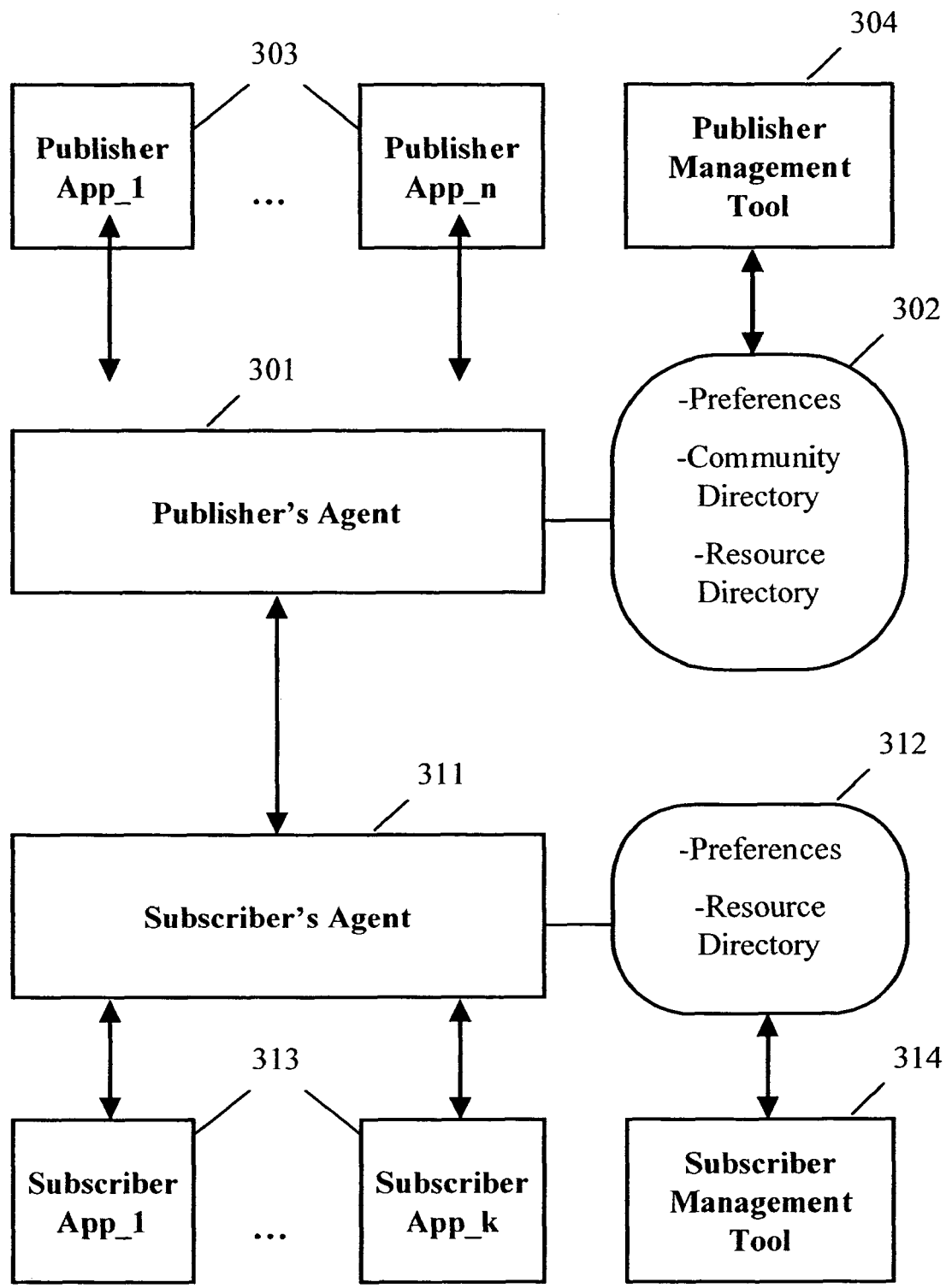
FIG. 3 is a schematic block diagram illustrating a sharing model where publisher's and subscriber's agents are used.

In an equally preferred embodiment of the invention, agents for facilitating resource sharing are used. FIG. 3 is a schematic block diagram illustrating publisher's and subscriber's agents. On the publisher's side, the agent 301 is located at some host servers or user's personal computer. The agent 301 serves as a gateway for all of the publisher's applications 303 to send out publishing announcements and change notifications, and to accept all requests from publishers including his community members and their friends or family members. The agent 301 may generate automatic responses to the requests in accordance with the publisher's preferences 302 thus minimize the publisher's manual interaction. On the subscriber's side, the agent 311 is located at some host servers or user's personal computer. The agent 311 serves as a gateway for all of the subscriber's applications 313 to accept the requests from publishers such as announcements and notifications, and to accept the requests from the peer subscribers such as forwarded announcements. The agent 311 may generate automatic responses in accordance with the subscriber's preferences 312. The agent 311 may also be used to invoke the subscriber's applications for accepting sharing. For example, the agent 311 updates the subscriber's address book after receiving a modified address card as described in the following paragraphs.

Figure 4:
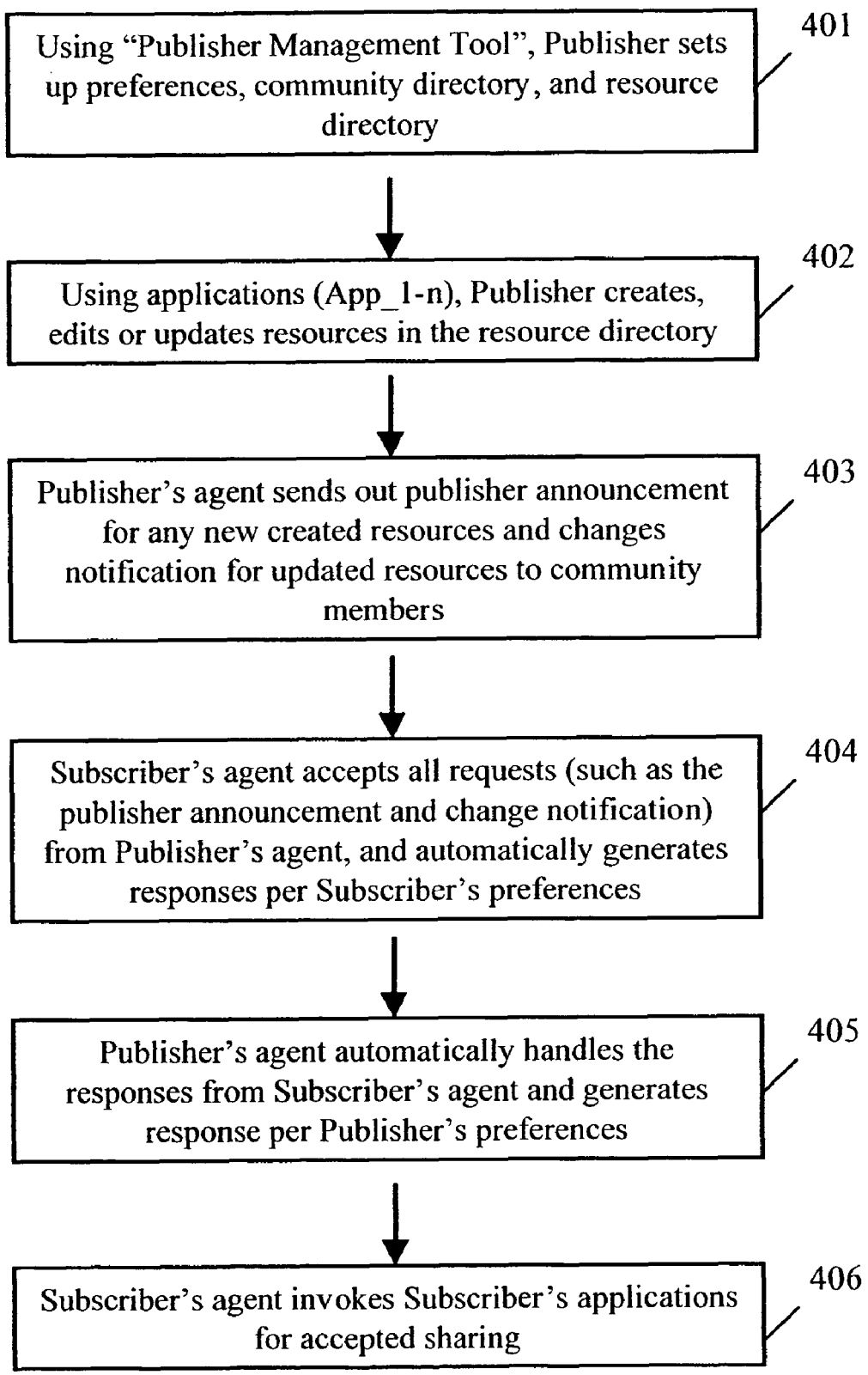
FIG. 4 is a flow diagram illustrating a process for facilitating resource sharing via agents.

FIG. 4 is a flow diagram illustrating a process for facilitating resource sharing via agents, which includes the following steps:

Step 401: A publisher uses "Publisher Management Tool" to setup preferences, community directory, and resource directory;

Step 402: The publisher uses applications to create, edit or update resources in the resource directory;

Step 403: The publisher's agent sends out publisher announcements for any new created resources and changes notification for updated resources to community members;

Step 404: The subscriber's agent accepts all requests (such as the publisher's announcement and change notification) from the publisher's agent, and automatically generates a response per the subscriber's preferences;

Step 405: The publisher's agent automatically handles the responses from the subscriber's agent and generates responses per the publisher's preferences;

Step 406: The subscriber's agent invokes the subscriber's applications for accepted sharing.

While a sharing service allows publishers to notify subscribers of their shared resources via e-mail etc., checks need to be in place to prevent this feature from being abused by spamming users. Therefore, in another equally preferred embodiment, a spam control mechanism is included. The spam control mechanism performs the following functions:

Rate limiting policies. For example, limit the number of notifications that a sender can send in a given time interval such as hourly, daily, weekly, and monthly.

Rate limiting notification to a unique receiver. For example, limit number of notifications that a sender can send to a given person in a given time interval.

Restriction on the number of publishes that can be made in one request/transaction.

Restriction on notification messages, such as size and content.

Such settings should be configurable by the system administrator without bringing down the system. It is hoped that having such policies in place should act as a deterrent to spammers from misusing sharing systems.

In an equally preferred embodiment, an Internet based address card service is incorporated with an existing address book service, which enables automatic sharing and updates of address book information. The members of the service can publish personal contact information, work information or/and personal notes with the people they want to stay in touch with. Those members can subscribe to automatically receive changes when the information is updated. The address card provides a link among the members to help them stay in touch, and to keep their address books up-to-date with all the correct information. The service ensures that the members always have the right contact information for their friends and family whenever they need it. By subscribing to the service, the user's friends and family can always have his current contact information whenever he updates it and he never has to worry about mistyping a friend's new phone number or e-mail address to copy it into his address book because they can share it with him automatically. Contact information in address cards is available via any interface to the host-based address book. The address card contact information is also available offline.

A user/member can easily set up a master address card of personal and contact information based on a template or templates provided by the service provider. Optionally, the user/member may choose to create his custom address cards. He can even include self-expression elements such as a "buddy icon", personal/business logo, stationery, etc. Based on the master address card, the user/member can create different address cards, or one address card with different views, for different audiences. If the user has more than one address card, he must indicate a default card. He can label each of his sub-cards, but the "label" itself is not published to the card subscribers. The user can edit the fields in his address cards by editing the master address card. When changes are saved, they are automatically published to subscribers of the address cards.

In a typical embodiment, the service provider provides templates from which a user/member selects sets of fields for sub-address cards. For example, the "Business" template may contain First Name, Last Name, Title, Company, Work Address, Work Phone, E-mail, and Web Page. These fields will be pulled from the address card and published as the user's "Business Card". Similarly, a different set of data may be pulled from the address card as the user's "Personal Contact Information".

A member/publisher can share his address card with certain designated recipients who may then choose to subscribe. Sharing may take place via e-mail or a new "direct" one-click communication mechanism. He can share an address card with all or part of the address book/"buddy list", leveraging "people lists". He can also share his address card with recipients of mail messages. He can even make his address card public, open to subscription by any member. The publisher may configure an expiration period of time for a publish offer or an invitation to share.

A member/subscriber with whom an address card is shared can accept the address card to add that information to his address book, and thereafter he receives automatic updates when the card changes. He may choose to automatically accept address cards from contacts already in his address book/"buddy list" or contacts with whom he has shared. Where possible, address cards are resolved with existing entries in the subscriber's address book, using screen name and other key fields to detect duplicates.

A member/publisher can share his address card with another member through various points of the service, e.g. via e-mail, instant messenger or online status displaying system such as AOL's Member Directory, Buddy Info Badge or People List. When a subscriber accepts, it will be easy to reciprocate with a share. A member/publisher may choose to publish to contacts not in his address book. In this case, these contacts can be manually or automatically added to the address book. Conversely, if a member deletes a subscriber from his address book, the subscriber is then un-subscribed from the publisher's address card. The member can choose via member preferences to automatically publish his default address card to some or all of those in his address book. If he so chooses, an invitation to subscribe is automatically sent to the recipient.

When a member/publisher updates his address card, the modifications are automatically reflected for members with whom it is shared so that information is always up-to-date. It may include options to turn off automatic updates on the publisher or subscriber side. It may also include an option to notify the subscriber of updates so that new information is not missed. The user can view and manage accepted subscriptions. He may also view pending and rejected subscriptions. He may un-publish to subscribers and pending subscribers, i.e. break the connection or revoke the offer.

A member/user receives a share/publish offer in various forms, e.g. an immediate popup (if online), a popup at sign-on, an indicator in his address book, and an e-mail. The member with whom an address card is shared also has different options, e.g. (1) exchange: a member subscribes to the publisher's address card and reciprocates with a publishing of his own address card (if it exists, otherwise the member has the option to set one up); (2) accept: the member subscribes to the publisher's address card only; and (3) reject: the member does not subscribe to the publisher's address card.

A member/subscriber to whom an address card is published can choose to accept (subscribe). The publisher's address card information is added to the subscriber's address book, and the subscriber then receives automatic updates of modifications to the publisher's address card. A member must subscribe in order to accept address card data. He cannot just accept once without making the publish/subscribe connection. The member who has subscribed may later choose to unsubscribe.

A member/subscriber can specify whether published modifications to an address card to which he has subscribed may trigger a notification. He can also choose a notification method. He can specify whether each address card to which he has subscribed merits notification upon modification on a per-card basis. Notification may include details of specific changes made to the address card. The subscriber may choose to lock certain fields in an address card to which he has subscribed. This may prevent overwriting that field with any changes made by the publisher.

A member/subscriber can choose via member preferences to automatically accept an address card that is published to him. This means that the member automatically subscribes to any address card that is published to him. He can automatically accept address cards from the entire address book or the "buddy list". In that case, anybody listed in the member's address book or "buddy list" at a given moment is accepted automatically by the member when any of them publishes his address card.

Once a member/subscriber has subscribed to an address card of another member's, the address card's information is available wherever address book information is accessed (Mail, YGP, etc). The subscriber may make edits to the "local" copy of the address card, but any edits are then overwritten if the publisher updates the address card because the publisher's address card always contains the most up-to-date information. If the member subscribes to multiple cards from the same publisher, these cards are merged as a single entry in the subscriber's address book. If an existing contact in the subscriber's address book has the same screen name and/or e-mail address as an address card to which he is subscribing, a duplicate is detected and the subscriber is prompted to an option whether to delete the duplicate. If the address card contains a superset of the duplicate entry, the existing entry is then replaced by the address card. Superset means that the content in all fields in the existing entry are matched exactly by the contents of the fields within the address card, and that the address card may also contain some additional fields where the existing entry is blank. If the address card intersects with an existing entry but is not a superset, the subscriber has the option to overwrite the existing entry with the received address card, or to keep them separate.

The member/subscriber can unsubscribe from an address card at any time. After the member has unsubscribed, he receives no further updates but the information he has already received remains in his address book as-is. If the subscriber deletes an address card to which he has subscribed, his subscription is eliminated accordingly.

While the address card works best among registered members, it still supports sharing with non-members through the export of standard contact card formats for a seamless sharing experience. Publish/subscribe for non-members includes e-mail based updates for published modifications. If a member/publisher chooses to publish his address card to a non-member contact, the non-member contact then receives a notification of the publication via e-mail with information embedded and a vCard attached that contains the member's address card information. The publisher can insert a personal note in the e-mail generated on an initial publish (This also applies to any mails sent to members). In the published e-mail sent to a non-member, the non-member can opt-in (subscribe) to future address card modifications via a link in the e-mail. If the non-member opts in, any modification made to the address card then generates an e-mail to him with updated information embedded and the vCard attached. Each update e-mail offers the ability to opt out (unsubscribe).

A similar mechanism can enable sharing among a group, such as a family, to which members can easily publish and subscribe to share updates among all members of the group. The address card and group sharing models may be applied for sharing other member-created information and lists, such as "favorite places" and "buddy list".

When a member/subscriber forwards an address card to a third party, the recipient receives a publish offer. Accepting the offer forms a publish/subscribe connection between the original publisher and the recipient. The original publisher is accordingly notified when the recipient has subscribed. Optionally, the original publisher is prompted to give permission to the recipient in order for a connection to be formed. The original publisher can set permissions on an address card, preventing subscribers from forwarding it. Default is to allow forwarding.

When a member/publisher sets a preference to automatically publish his address card to anybody to whom he sends mail, his default address card is published (unless otherwise specified). On a per-message basis, the member can choose whether his address card is automatically published to the mail recipient(s).

A member/subscriber can set a preference to automatically subscribe to anybody to whom he sends an e mail, if that contact is implicitly published. If the publisher publishes on "mail send", the recipient must be able to subscribe when he reads that mail. If the recipient/member chooses to "Add Sender to Address Book," he automatically subscribes to the sender's (publisher's) address card. Optionally, the recipient/member may choose to reciprocate with a publication to the sender.

The address card comprehends the parent control settings on the publisher side. Children do not have access to the address card. Young teens are prevented from publishing a public address card.

These are further illustrated by exemplary screens and pop-ups of a user interface (UI) implementing above described scheme.

Figure 5A:
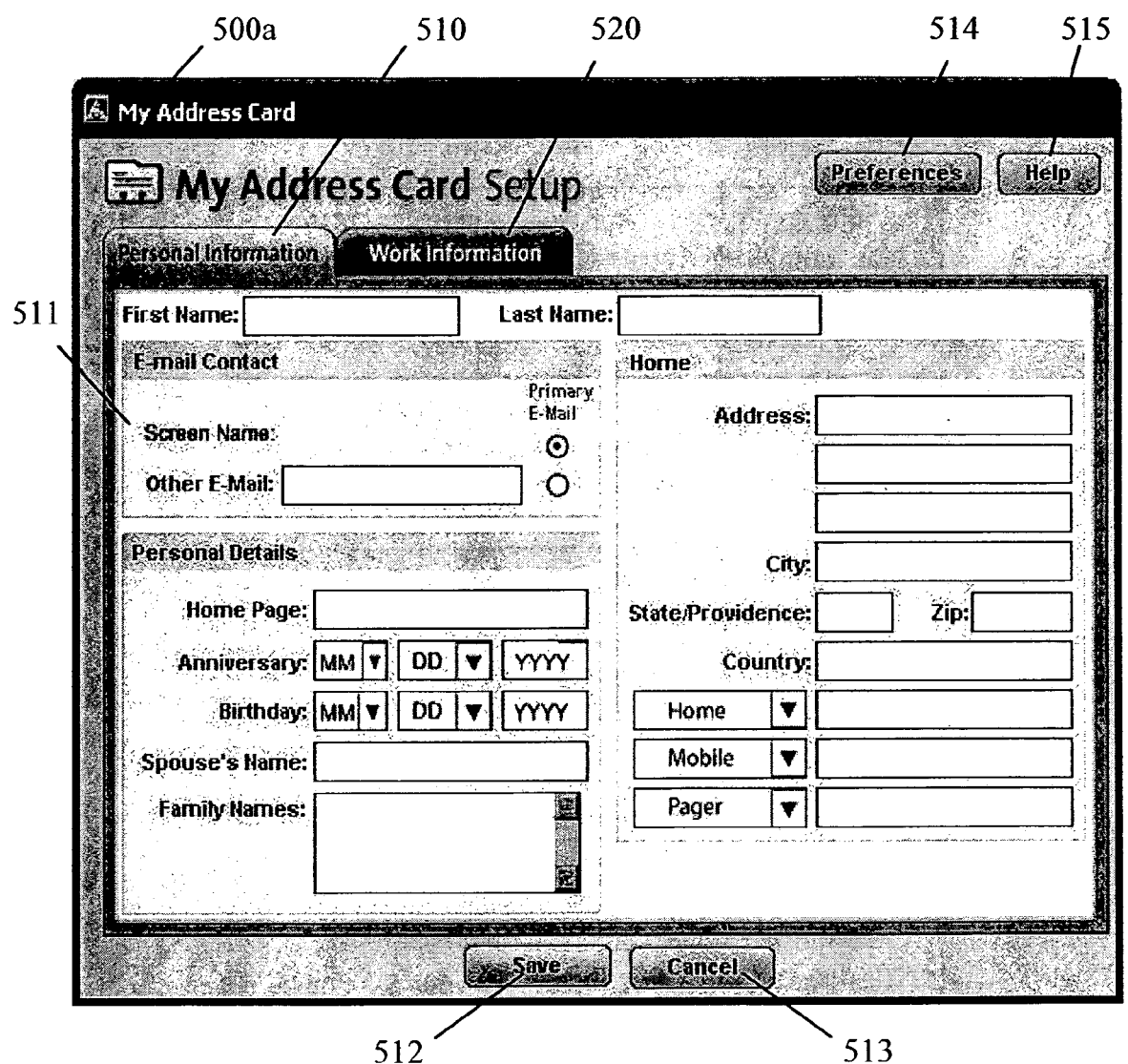
FIG. 5A is a schematic diagram showing an exemplary user interface (UI) for "My address card" with the "Personal Information" tab at the front.

FIG. 5A is a schematic diagram showing an exemplary UI for "My address card" 500a with the "Personal Information" tab 510 brought to the front. The user's setup page of the UI includes: a "Personal Information" tab 510, which is an area where a member, i.e. publisher, enters information about himself; a "Work Information" tab 520 which can be brought to the front when it is clicked; a "screen name" mark 511, which is permanent, i.e. hard-coded; a virtual "Save" button 512, which is used to save the entered data when it is clicked; a "Cancel" button 513; a "Preferences" button 514, from which the user may set his preferences; and a "Help" button 515, from which the user accesses to instructional information. The publisher's preferences may include options such as "auto-publish to his Address Book/Buddy List as contacts added", or "do not auto-publish". If the publisher chooses to set up "auto-publish", any member (account holder) registered with the Web service may subscribe to his address card.

Figure 5B:
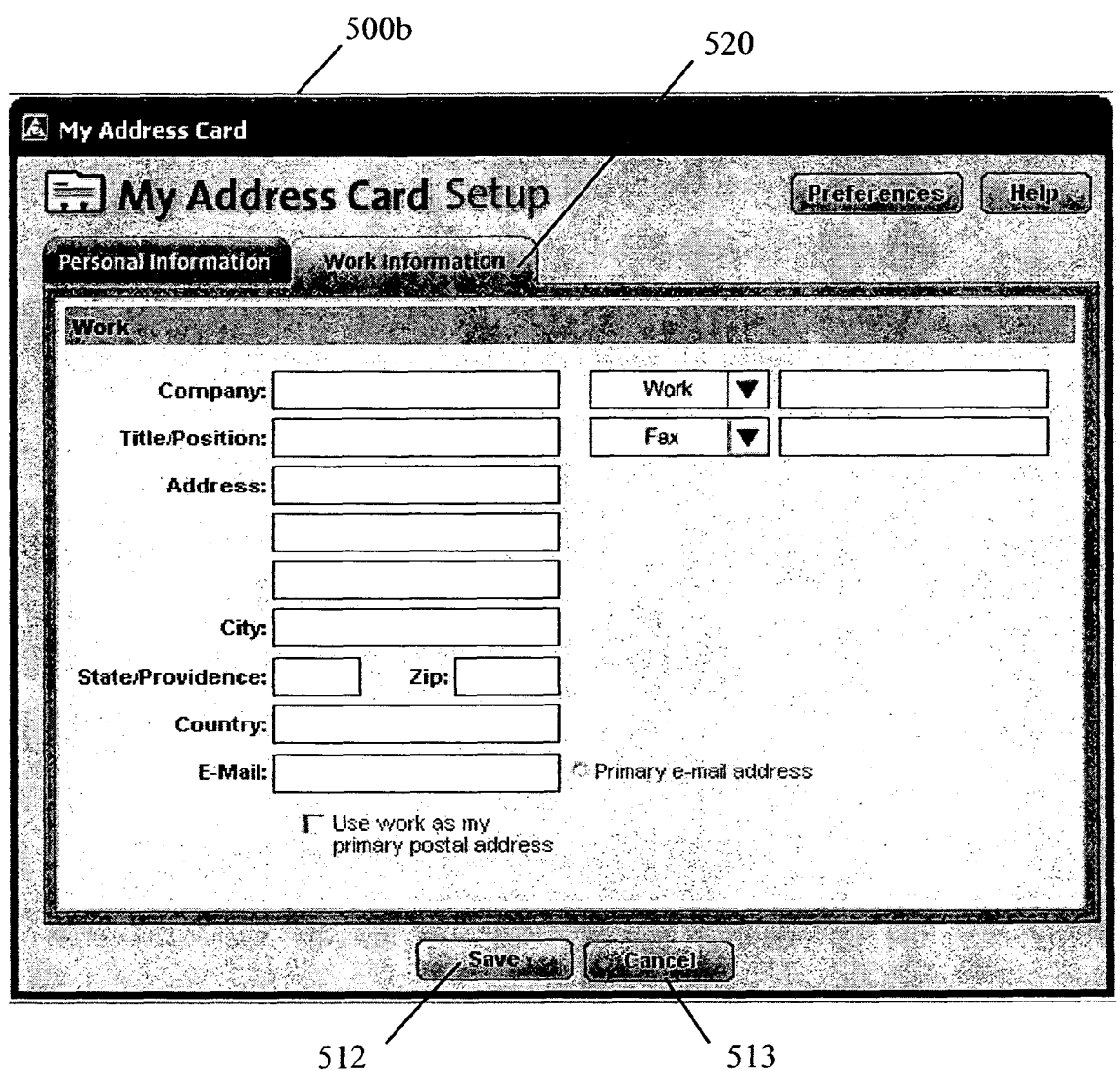
FIG. 5B is a schematic diagram showing the UI setup page when the "Work Information" screen is at the front.

FIG. 5B is a schematic diagram showing the UI setup page 500b when the "Work Information" screen 520 is brought to the front. From this page, the user enters his work information and saves it by clicking the save button 512.

Figure 5C:
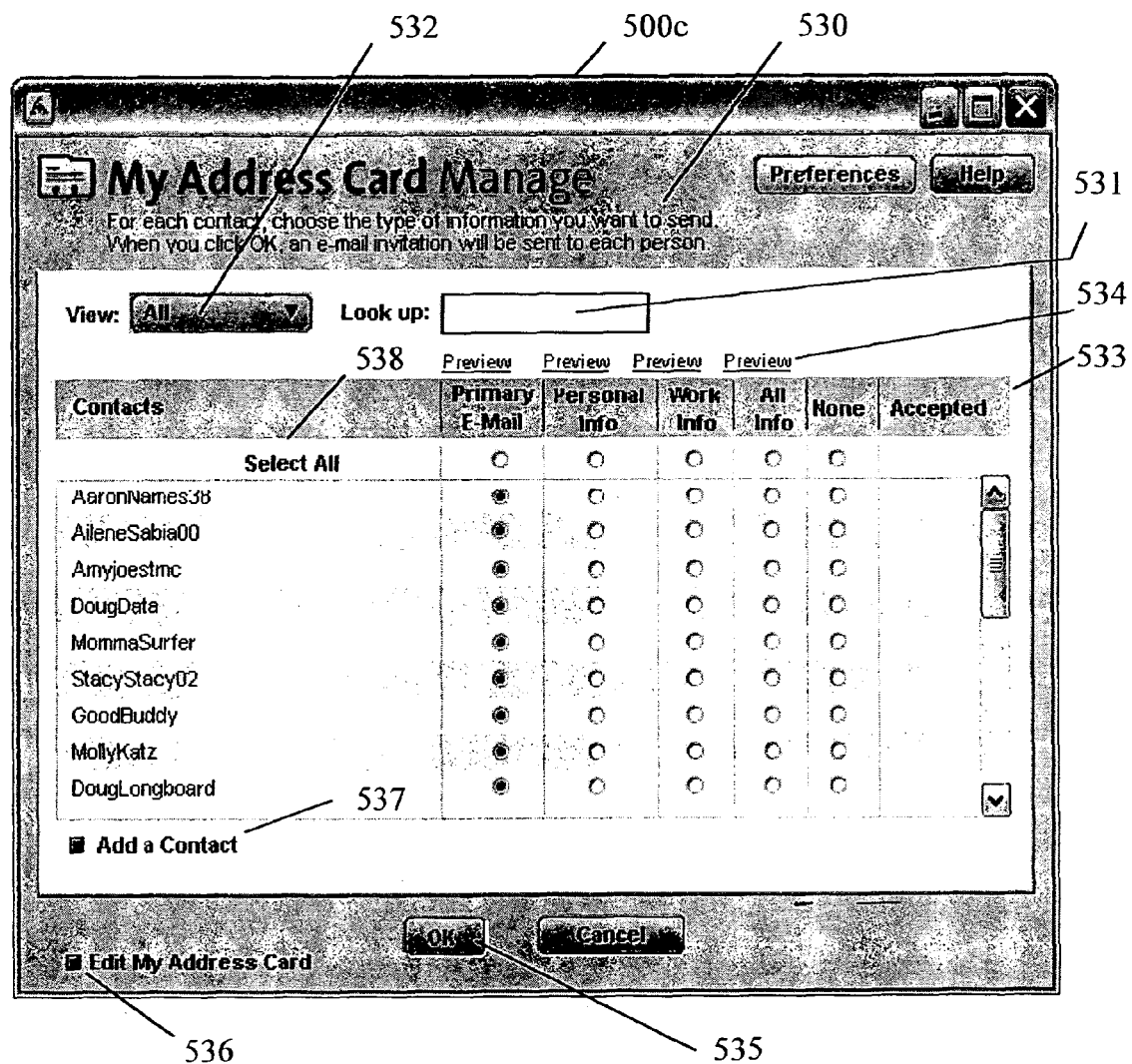
FIG. 5C is a schematic diagram showing a manage screen of the UI.

FIG. 5C is a schematic diagram showing the UI manage screen 500c. An informational text 530 is shown below "My address card—Manage", which communicates a message that all subscribers will receive updated information when the "Update" button in the update screen of FIG. 5F is clicked. The "Look Up" window 531 allows the user to find subscribers by name. The views dropdown menu 532 shows all category names from a current category list in the address book as shown in FIG. 5L. The drop down menu also includes a "default to all" option and follows address book defaults and hierarchy, for example: All_Co-workers, Family and Friends_Auto-added, Uncategorized_Manage. The "Column Headers" 533, such as Contacts, Primary e-mail, Personal Information, Work Information, All Information, None, Accepted, are used to set up specific views of the sharable address card. When a header is clicked, columns sort according to the criteria chosen. For example, when Primary E-mail header is clicked all those subscribers to Primary E-Mail information will shuffle to the top. Each of the preview links 534 invokes a view of that view-type, on top of, but offset to screen views shown in FIGS. 5D and 5E.

Figure 5D:
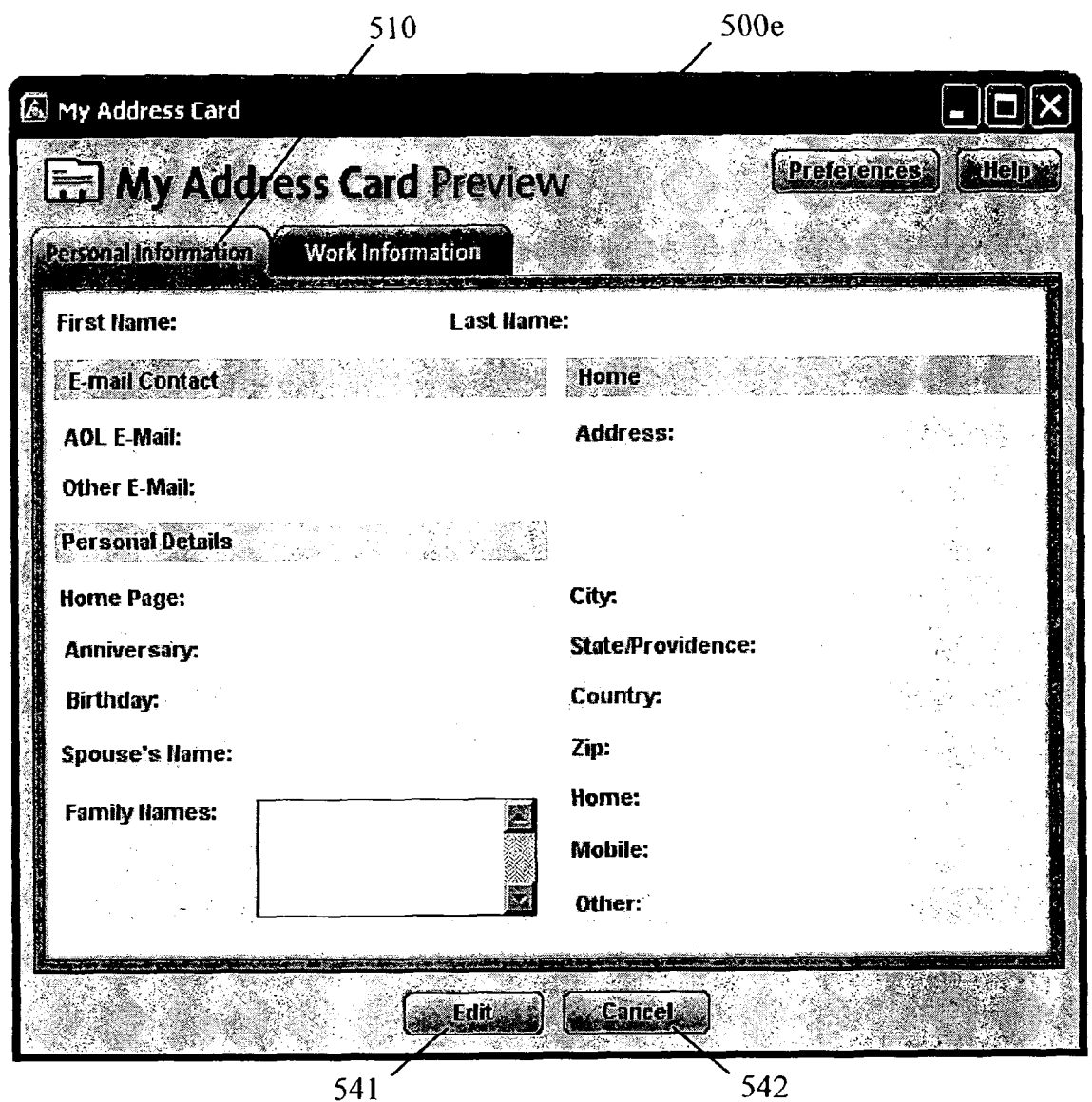
FIG. 5D is a schematic diagram showing an exemplary preview screen with the "Personal Information" tab at the front.
Figure 5E:
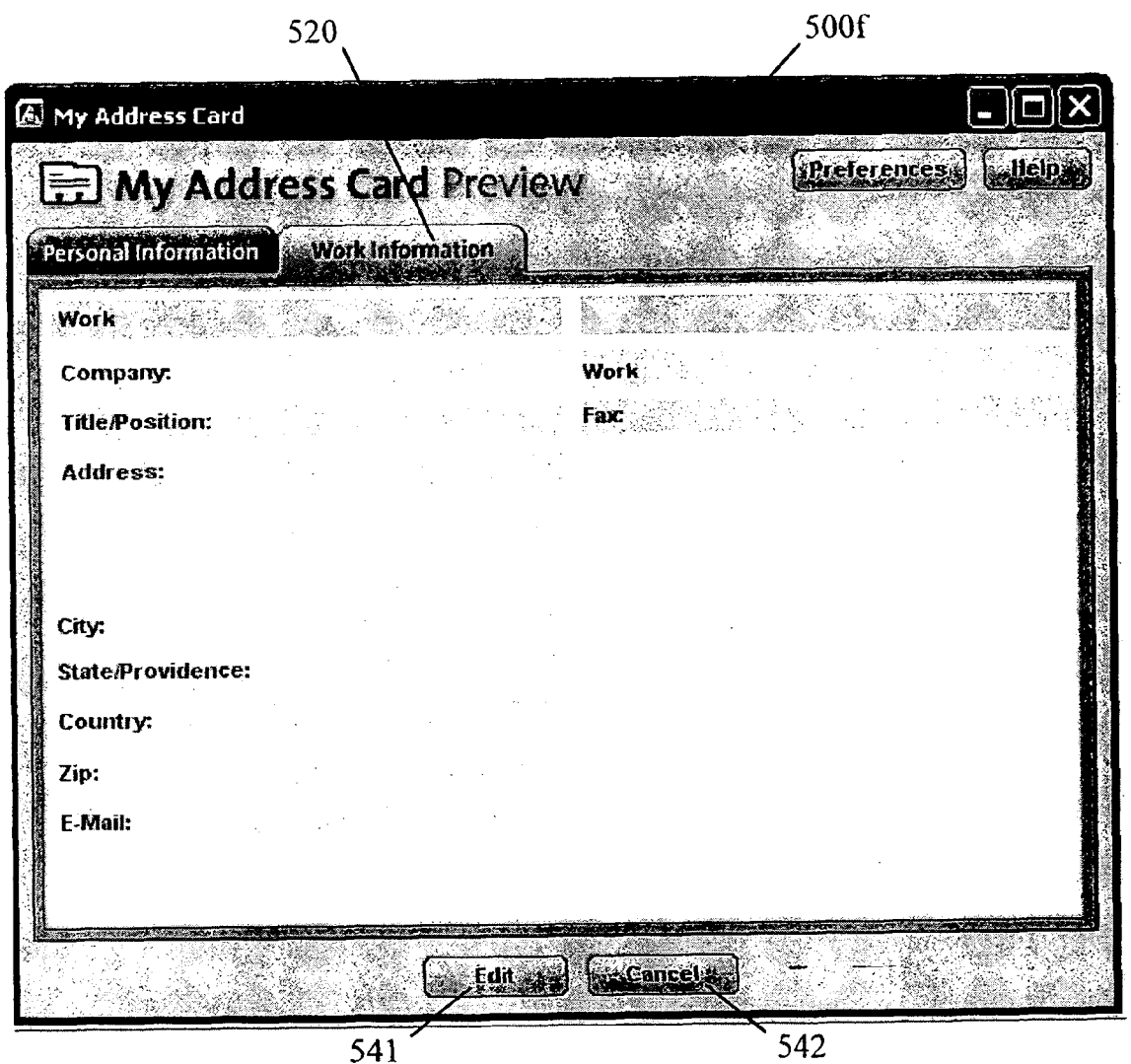
FIG. 5E is a schematic diagram showing an exemplary preview screen with the "Work Information" tab at the front.
Figure 5F:
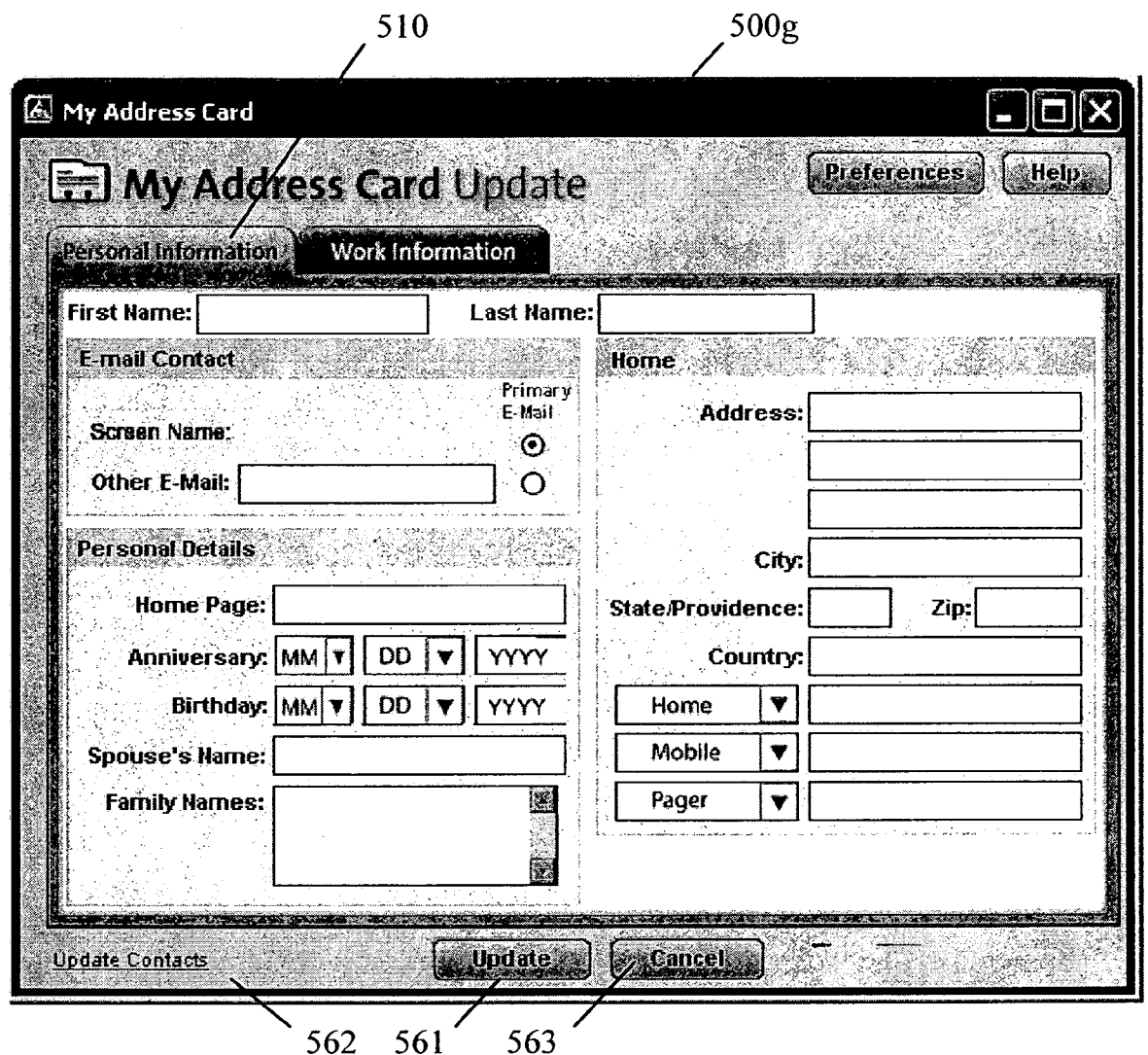
FIG. 5F is a schematic diagram showing an exemplary update screen with the "Personal Information" tab at the front.

FIG. 5D is a schematic diagram showing an exemplary preview screen 500e with the "Personal Information" tab 510 at the front. FIG. 5E is a schematic diagram showing an exemplary preview screen 500f with the "Work Information" tab 520 at the front. In the preview screens, the previously entered information is static and uneditable. Note that preview of information depends on what privileges a member gives recipients of card. For example, the "All Info" view covers "E-mail contact", "Personal", "Work" and details; the "Work Info" view covers "E-mail contact" and work information; the "Personal Info" view covers "E-mail contact" and Home information and details; and the "Primary E-mail" view only covers username and e-mail address. By clicking the "Edit" button 541, the user is prompted to "My address card Update" (FIG. 5F and FIG. 5G) and the preview screen closes at the same time. Otherwise, by clicking the cancel button 542, the screen is closed.

Figure 5G:
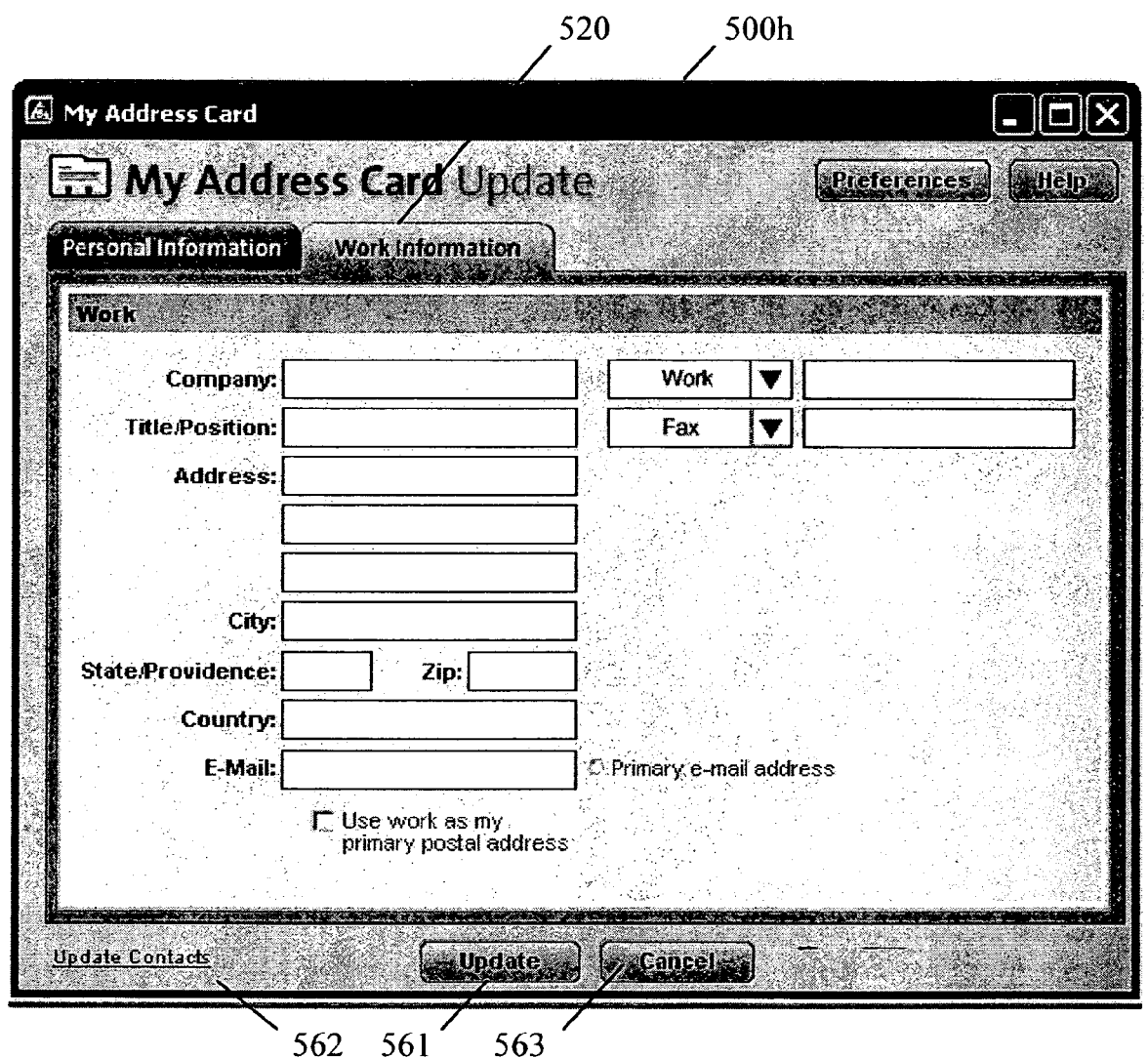
FIG. 5G is a schematic diagram showing an exemplary update screen with the "Work Information" tab at the front.
Figure 5H:
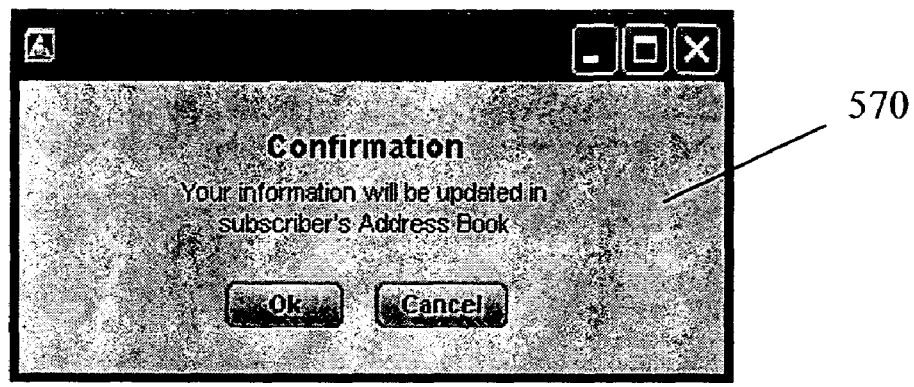
FIG. 5H is an exemplary update confirmation pop-up.

FIG. 5F is a schematic diagram showing an exemplary update screen 500g with the "Personal Information" tab 510 at the front. FIG. 5G is a schematic diagram showing an exemplary update screen 500h with the "Work Information" tab 520 at the front. After editing the information in the cards, the user clicks the "Update" button 561 whereby he is prompted to a confirmation card as shown in FIG. 5H. By clicking the "Update Contacts" link 562, the user returns to the manage screen of FIG. 5C. Otherwise, by clicking the cancel button 563, the update screen is closed and no edits or updates are accepted.

Figure 6A:
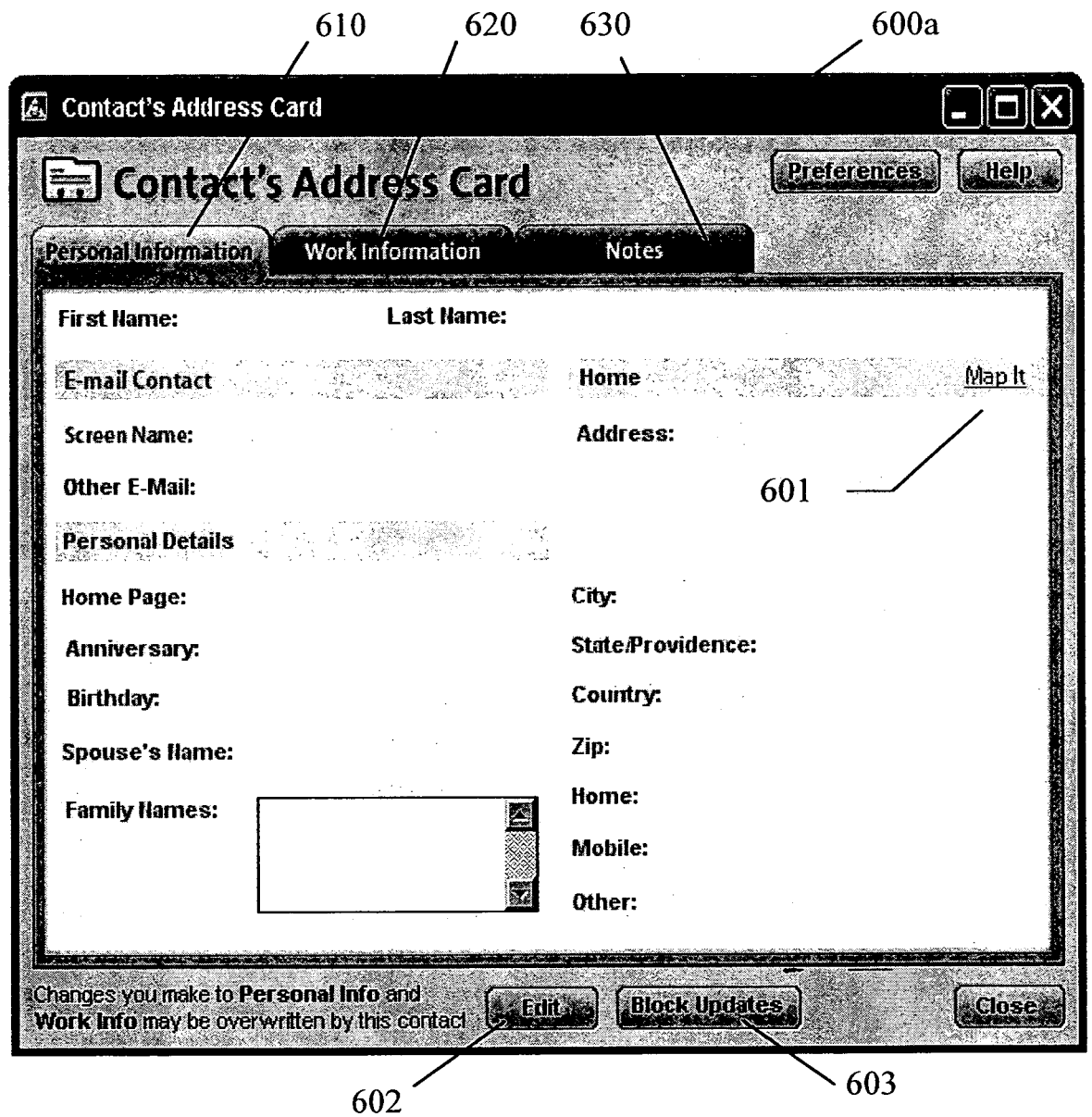
FIG. 6A is an exemplary screen for member receive with the "Personal Information" tab at the front.

Now referring back to FIG. 5C, the manage screen 500c, where the "Edit My address card" link 536 takes the user to the update screens as shown in FIG. 5F and FIG. 5G. By clicking the "Add a Contact" link 537, the user is returned a screen for adding a new contact to the address book as shown in FIG. 6A. The "Select All" button 538 enables the user to check the entire row by a single click.

Figure 5I:
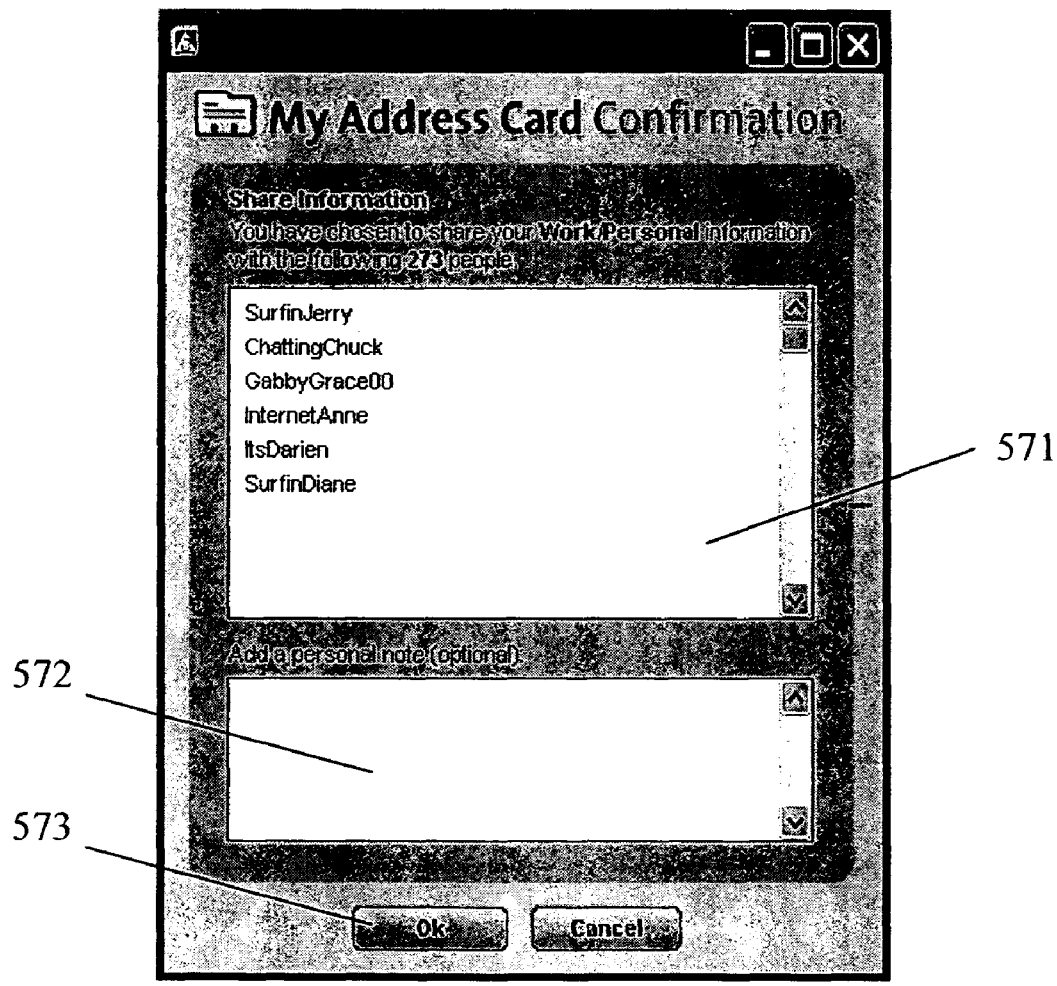
FIG. 5I is an exemplary share confirmation pop-up.

The "OK" button 535 in FIG. 5C takes the user to a confirmation card with different appearances depending on the settings. For "send only", the "OK" button 535 takes the user to a confirmation-send card as shown in FIG. 5I, which includes the names from the manage screen of FIG. 5C that this address card will be sent to. In FIG. 5I, the user cannot act on names in the name list. By clicking the "OK" button 573, the address card is sent to the designated recipients via pre-populated e-mail. If the personal note field 572 is filled out, the information therein is sent to the recipients at the same time.

Figure 5J:
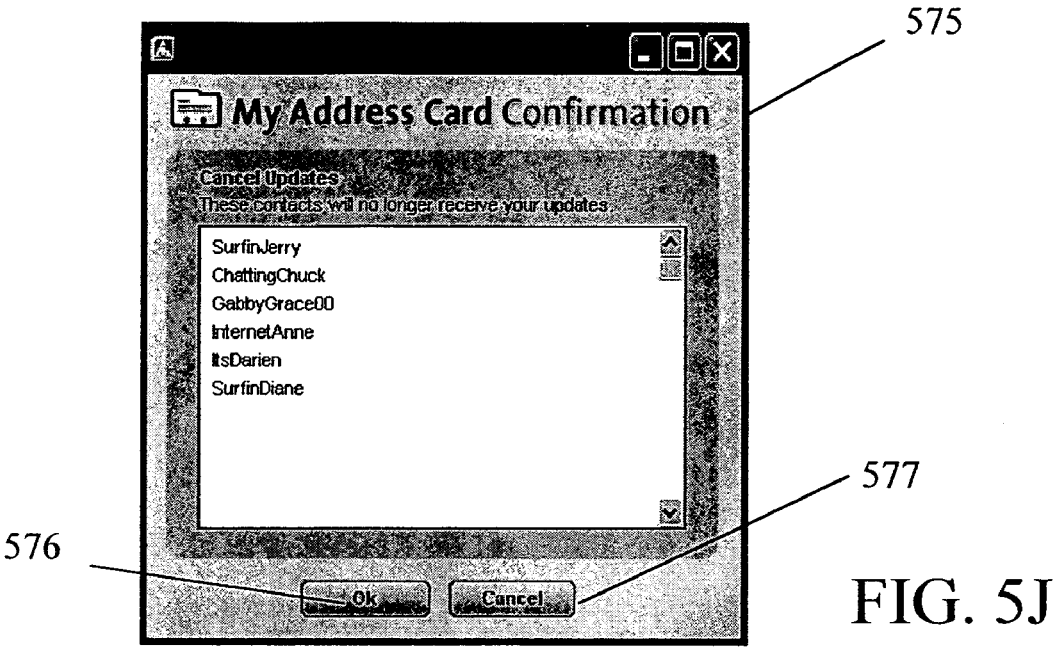
FIG. 5J is an exemplary cancel update pop-up.

Still in FIG. 5C, the "OK" button 535 may take the user to a confirmation-cancel updates tab 575 as shown in FIG. 5J, which includes the names from the manage screen of FIG. 5C that this address card will stop sending updates to. In FIG. 5J, the user cannot act on the names in the list. Clicking on the "OK" button 576 breaks the link to the named subscribers and closes the screen. If this is the user's first time sending an address card, then a preferences screen as shown in FIG. 6H is invoked. The "OK" button 576 closes the manage screen of FIG. 5C as well. The "Cancel" button 577 closes the screen 575 and returns the user to the manage screen 500c of FIG. 5C, and thus no subscriptions are cancelled.

Figure 5K:
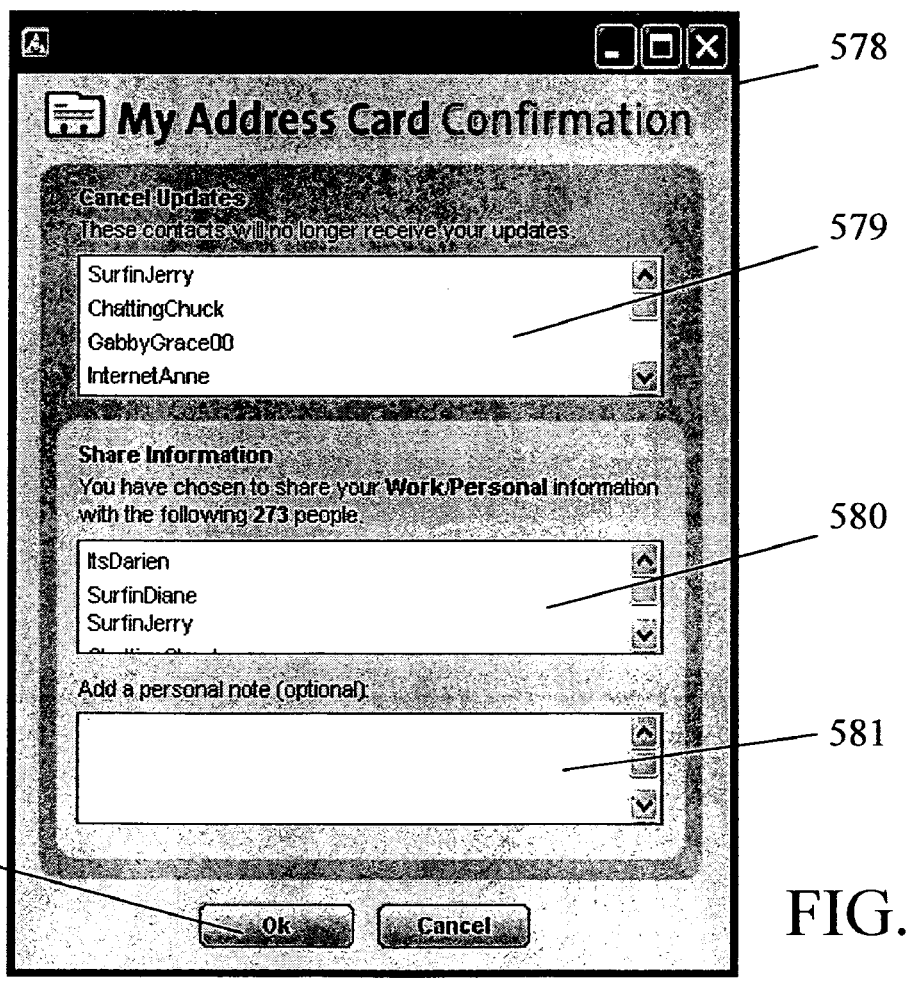
FIG. 5K is an exemplary extended cancel/share update confirmation pop-up.
Figure 5L:
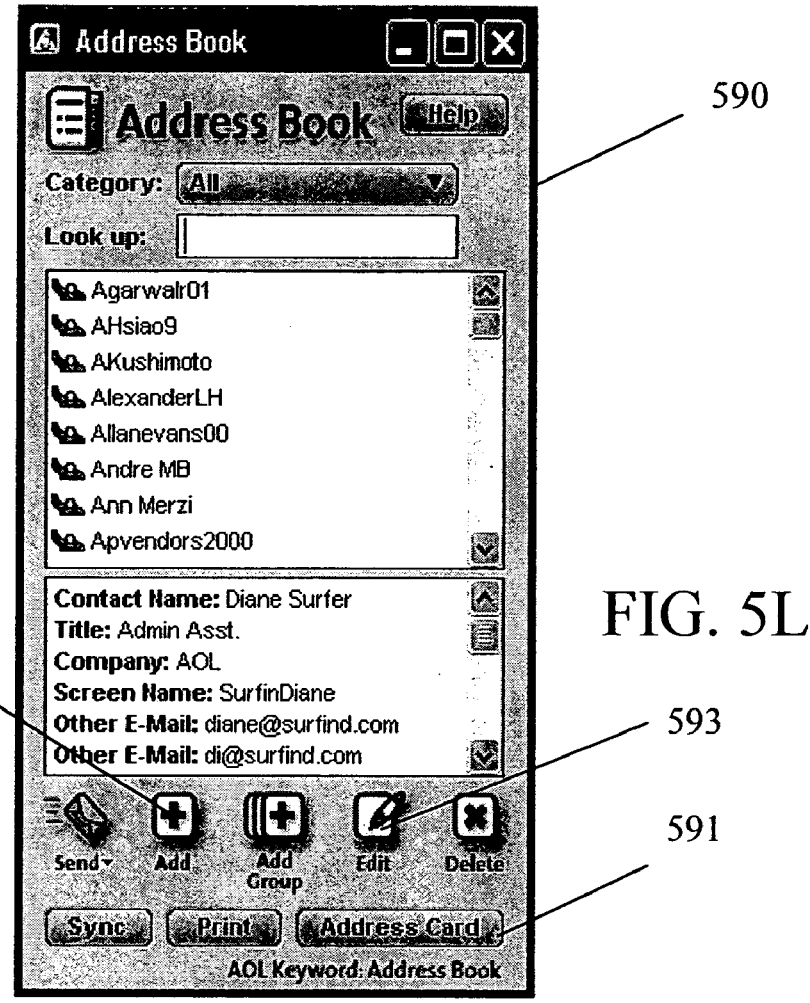
FIG. 5L is an exemplary address book linked to address card.

The "OK" button 535 in FIG. 5C may take the user to an extended confirmation-cancel updates screen 578 as shown in FIG. 5K, which is a combination of the cards of FIG. 5I and FIG. 5J. The card includes a cancel list box 579 and a send (share) box 580. The cancel list 579 contains the names from the manage screen in FIG. 5C that this address card will stop sending updates. The send list box 580 contains the names from the manage screen in FIG. 5C that this address card will be sent to. The names box 579 and box 580 are not editable, i.e. the user cannot act on them. When the "OK" button 582 is clicked, the address card is sent to the designated recipients via pre-populated e-mail. If the personal note field 581 is filled out, the entered data is also sent to the recipients. If this is the user's first time sending an address card, then a preferences screen as shown in FIG. 6H is invoked.

Figure 5M:
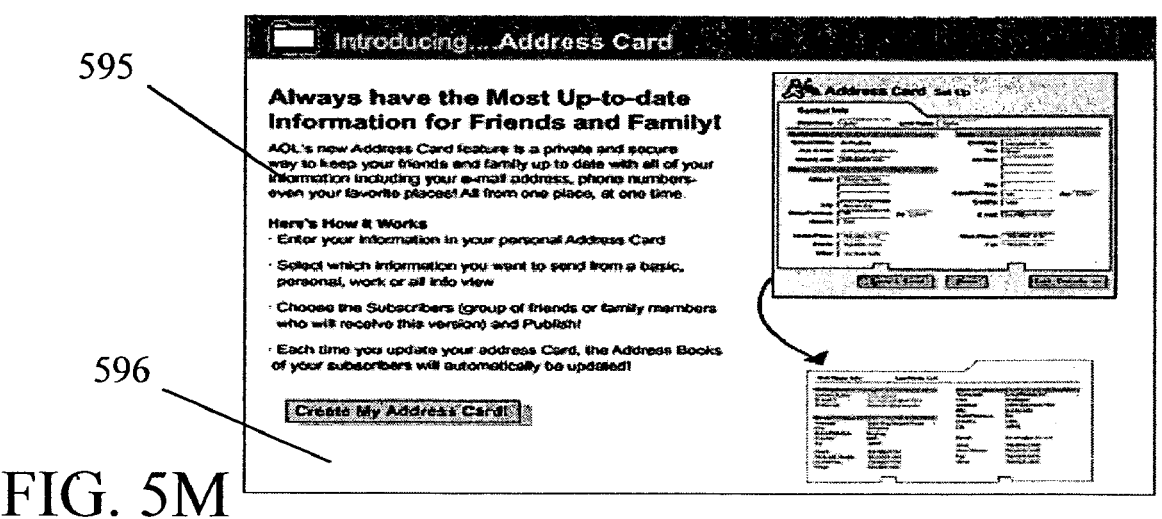
FIG. 5M is an exemplary introduction pop-up.

The address card is incorporated into an existing address book scheme. FIG. 5L is a schematic diagram showing the address book screen 590 with an address card button 591. If the user does not have an address card set up, the button 591 takes the user to the introduction screen 595 as shown in FIG. 5M. The screen 595 provides a link 596 for creating "My address card".

Figure 6B:
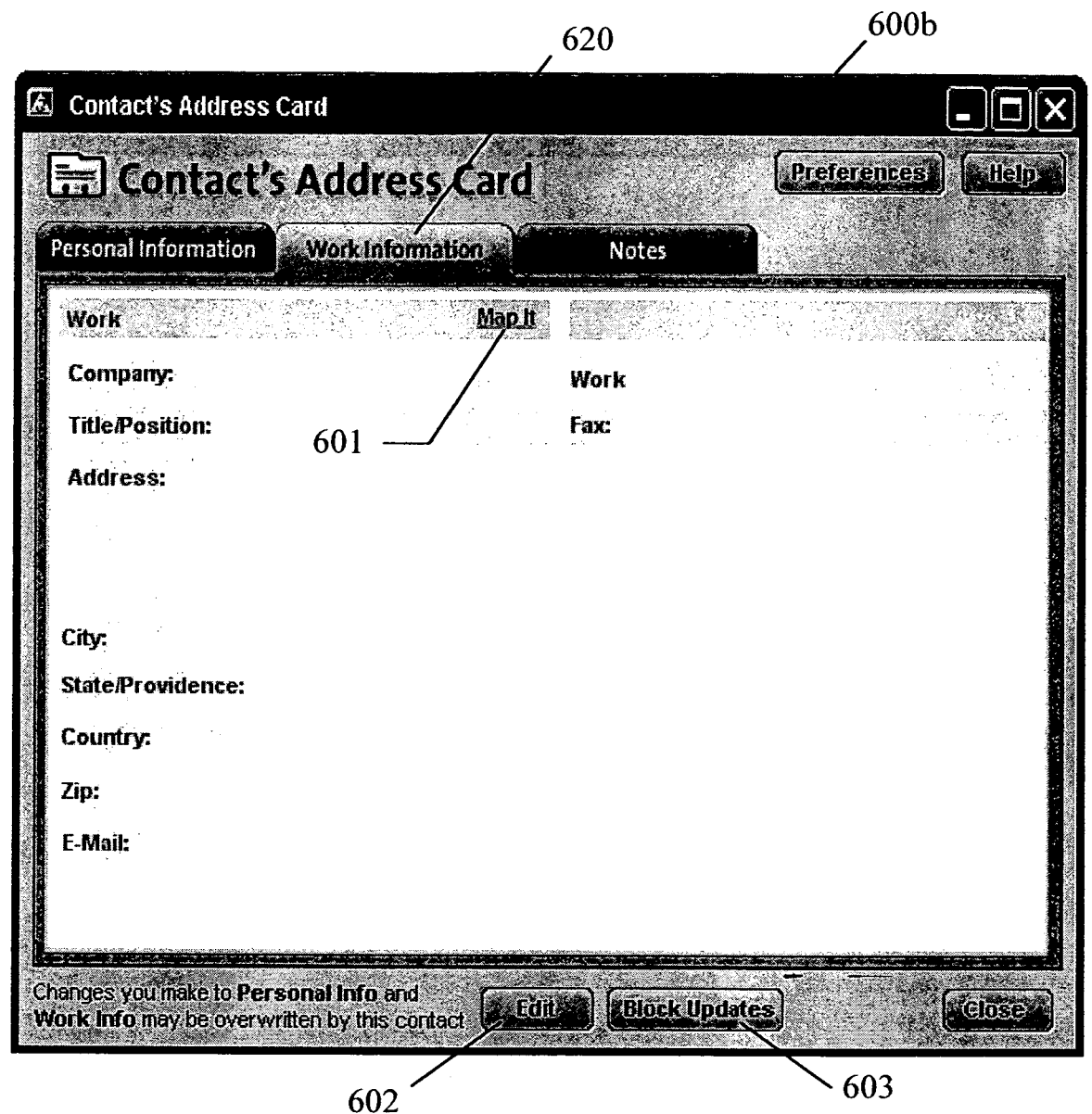
FIG. 6B is an exemplary screen for member receive with the "Work Information" tab at the front.
Figure 6C:
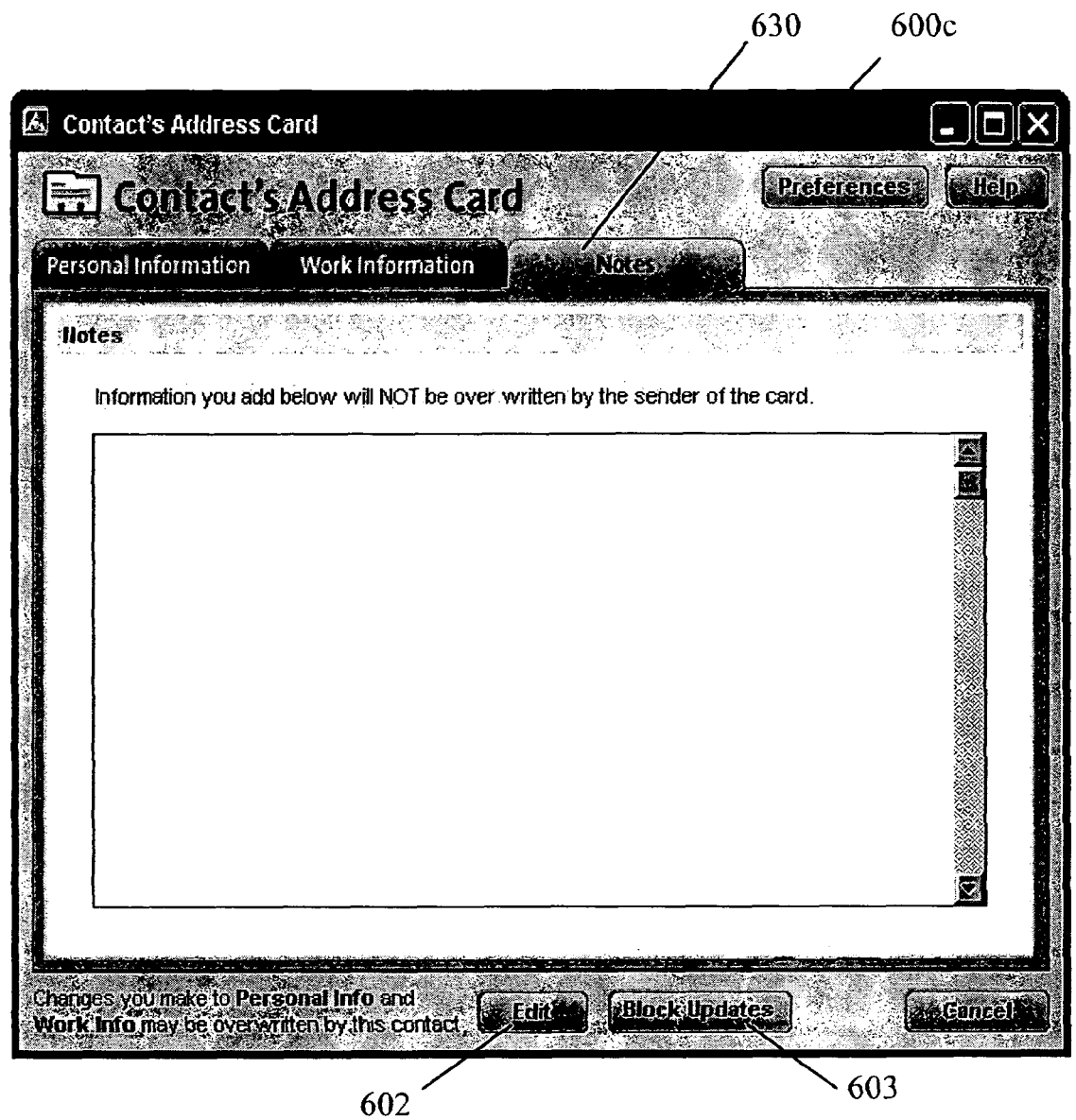
FIG. 6C is an exemplary screen for member receive with the "Notes" tab at the front.
Figure 6D:
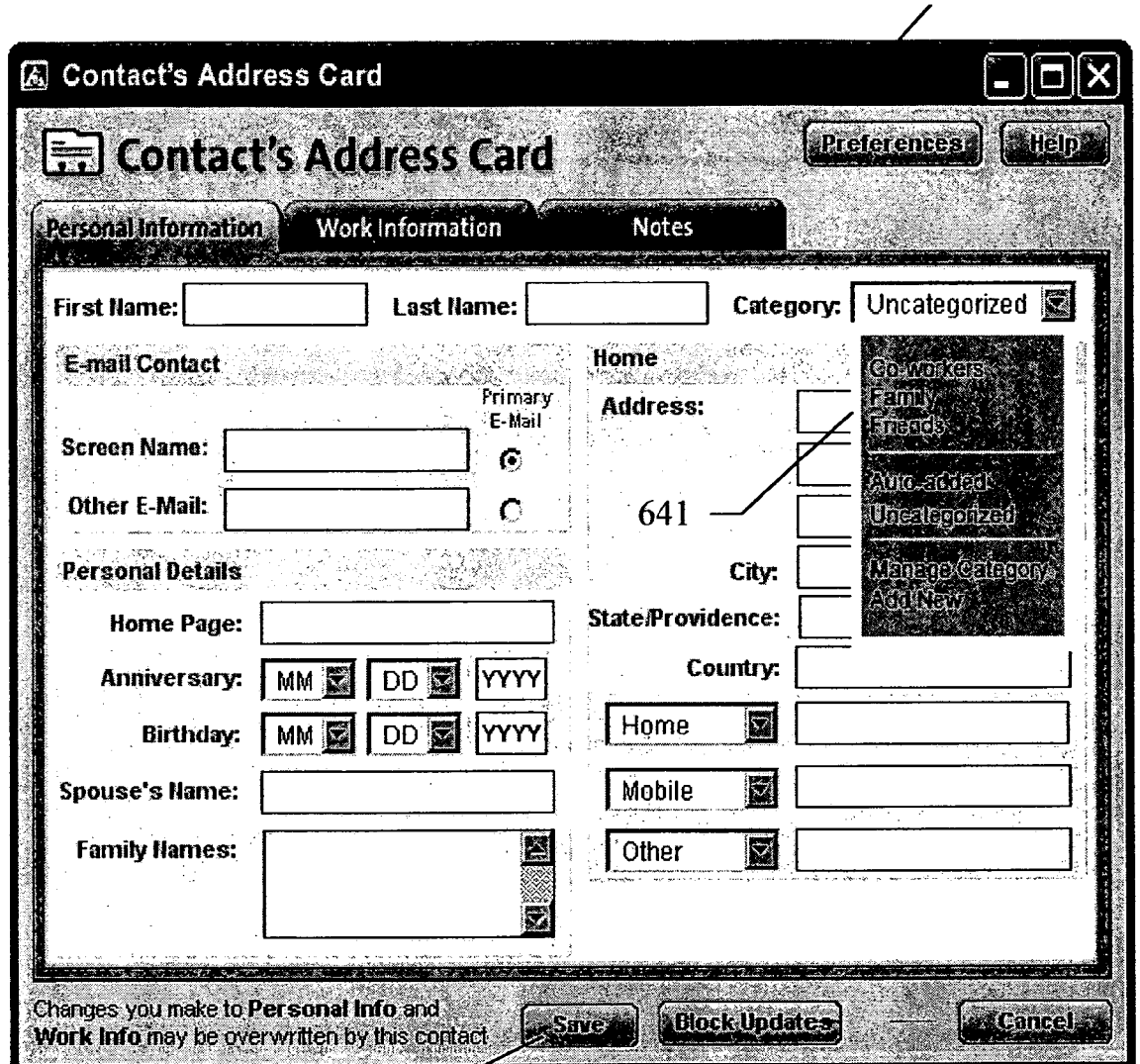
FIG. 6D is an exemplary editable receive screen with the "Personal Information" at the front.
Figure 6E:
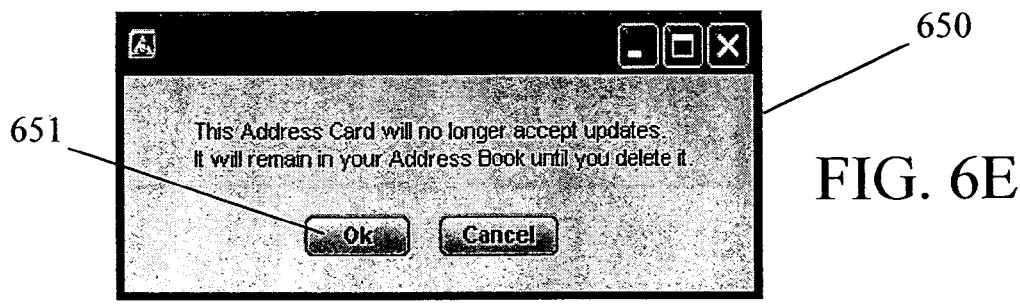
FIG. 6E is an exemplary "Unsubscribe Confirmation" pop-up.

FIGS. 6A, 6B and 6C are schematic diagrams showing screens of a sender's address card received by a user. FIG. 6A is a screen for member receive 600a with the personal information tab 610 at the front. FIG. 6B is a screen for member receive 600b with the work information tab 620 at the front. FIG. 6C is a screen for member receive 600c with the notes tab 630 at the front. The personal information tab 610 and the work information tab 620 also include a "Map It" link 601, which takes the user to a map request for location and/or driving directions. The "Edit" button 602 in FIG. 6A invokes an editable receive screen 600d as shown in FIG. 6D. Similarly, the "Edit" button 602 in FIG. 6B and FIG. 6C invokes an editable work information receive screen and an editable note screen respectively. The "Block Updates" button 603 in FIGS. 6A, 6B and 6C invokes an "Unsubscribe Confirmation" tab 650 as shown in FIG. 6E. The "OK" button 651 blocks further updates to this address card.

Figure 6F:
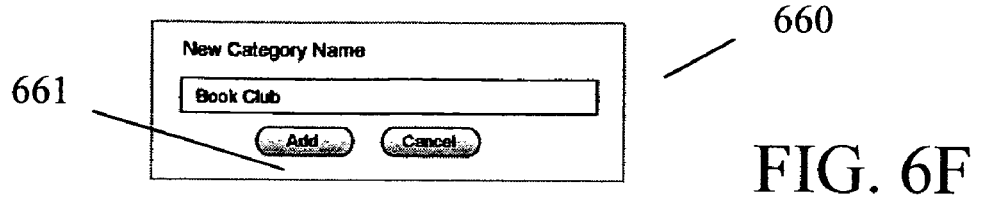
FIG. 6F is an exemplary pop-up for saving the address card to a new category.
Figure 6G:
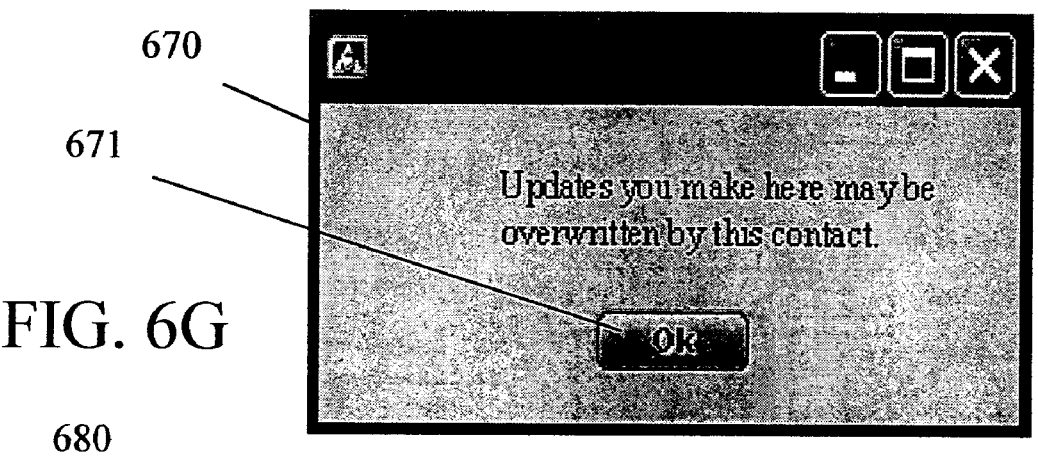
FIG. 6G is an exemplary pop-up for overwriting confirmation.
Figure 6H:
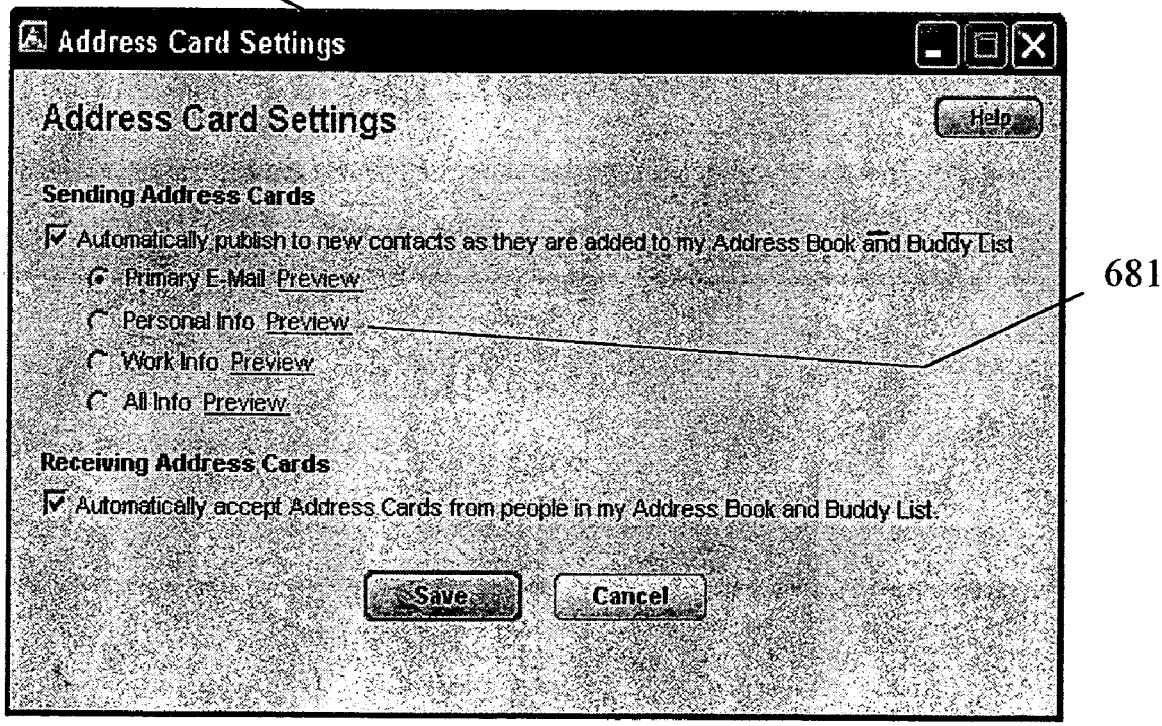
FIG. 6H is an exemplary pop-up for address card preferences settings.

Referring to FIG. 6D, where the category dropdown 641 shows all categories that this address card is saved hereunder. If the user chooses to add the saved card to a new category, he is returned a small tab 660 as shown in FIG. 6F. The "Add" button 661 adds a new category name and puts the new category at the top of the drop down list. The "Save" button 642 in FIG. 6D saves all information and takes the user to an over write confirmation screen 670 as shown in FIG. 6G. The "OK" button 671 accepts all changes made by the user and closes the screen.

FIG. 6H is a schematic diagram showing a preferences screen 680, which is part of the address card settings. Note that the preview link 681 invokes the preview of the address card as shown in FIG. 5D.

Figure 7A:
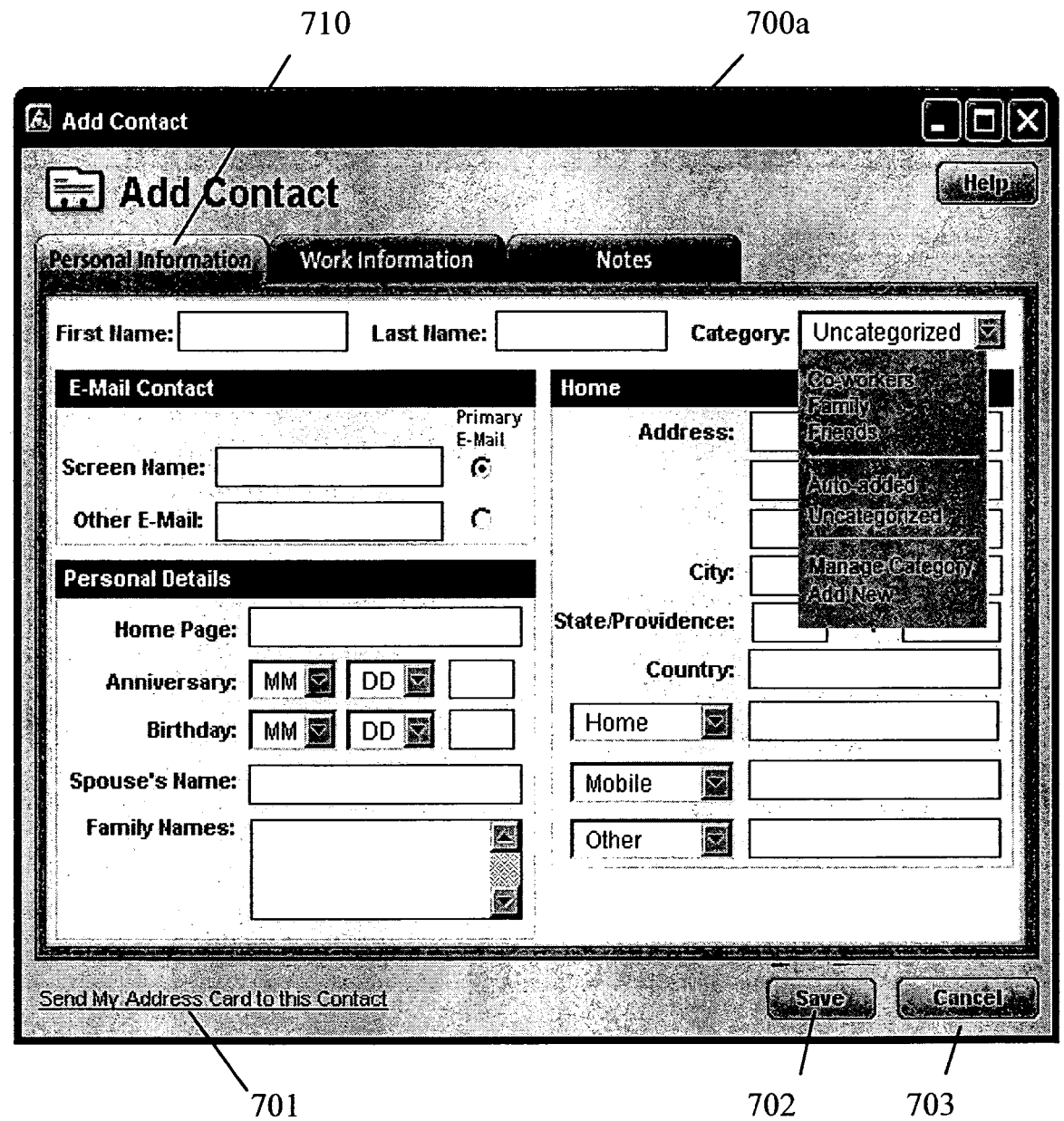
FIG. 7A is an exemplary add contact screen with the "Personal Information" tab at the front.
Figure 7B:
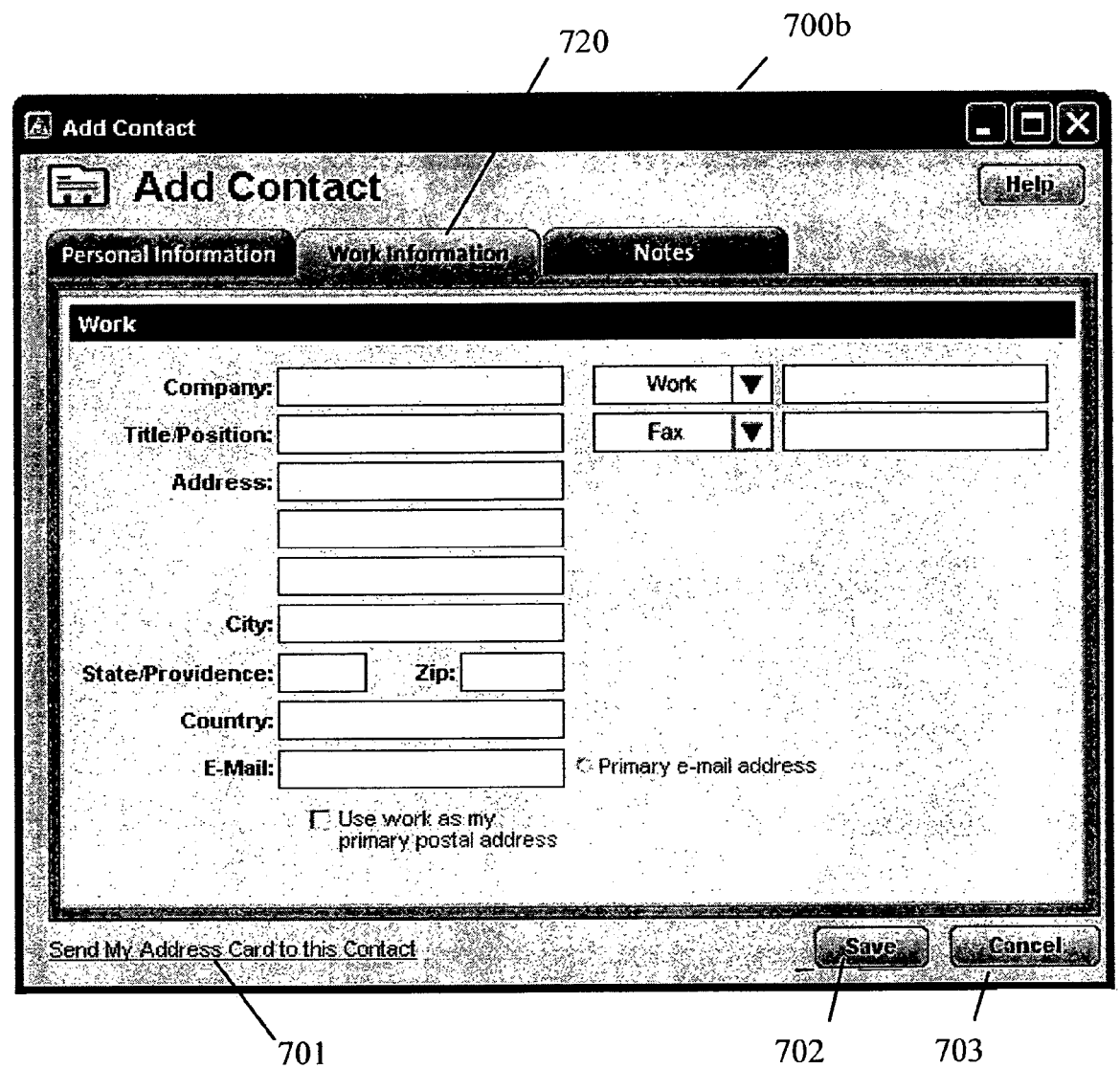
FIG. 7B is an exemplary add contact screen with the "Work Information" tab at the front.

Now referring back to FIG. 5L, if a user has already set up his address card, the user can get to the "Add a Contact" screen either by clicking the "Add" button 592, or by clicking the "address card" button 591 which takes him to the manage screen in FIG. 5C, where he can select the "Add a Contact" 515. Either way, the user is returned a screen 700a, as shown in FIG. 7A, for adding a new contact's information. The contact's personal information is added into the "Personal Information" card 710. The contact's "Work Information" is added when the corresponding "Work Information" card 720 is brought to the front of screen 700b as shown in FIG. 7B. The contact's "Notes" is added when the corresponding "Notes" card 730 is brought to the front of screen 700c as shown in FIG. 7C.

Figure 7C:
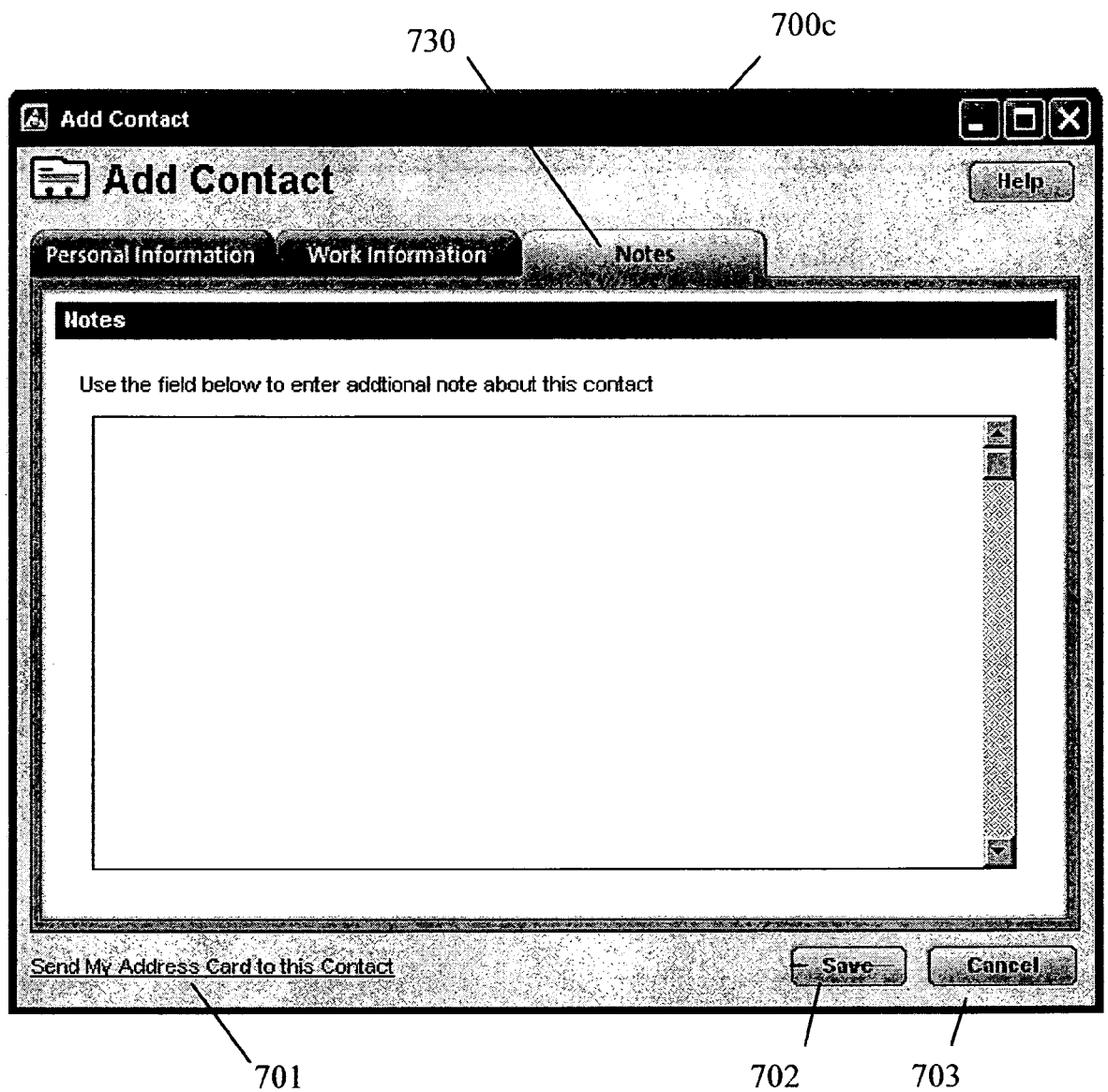
FIG. 7C is an exemplary add contact screen with the "Notes" tab at the front.
Figure 7D:
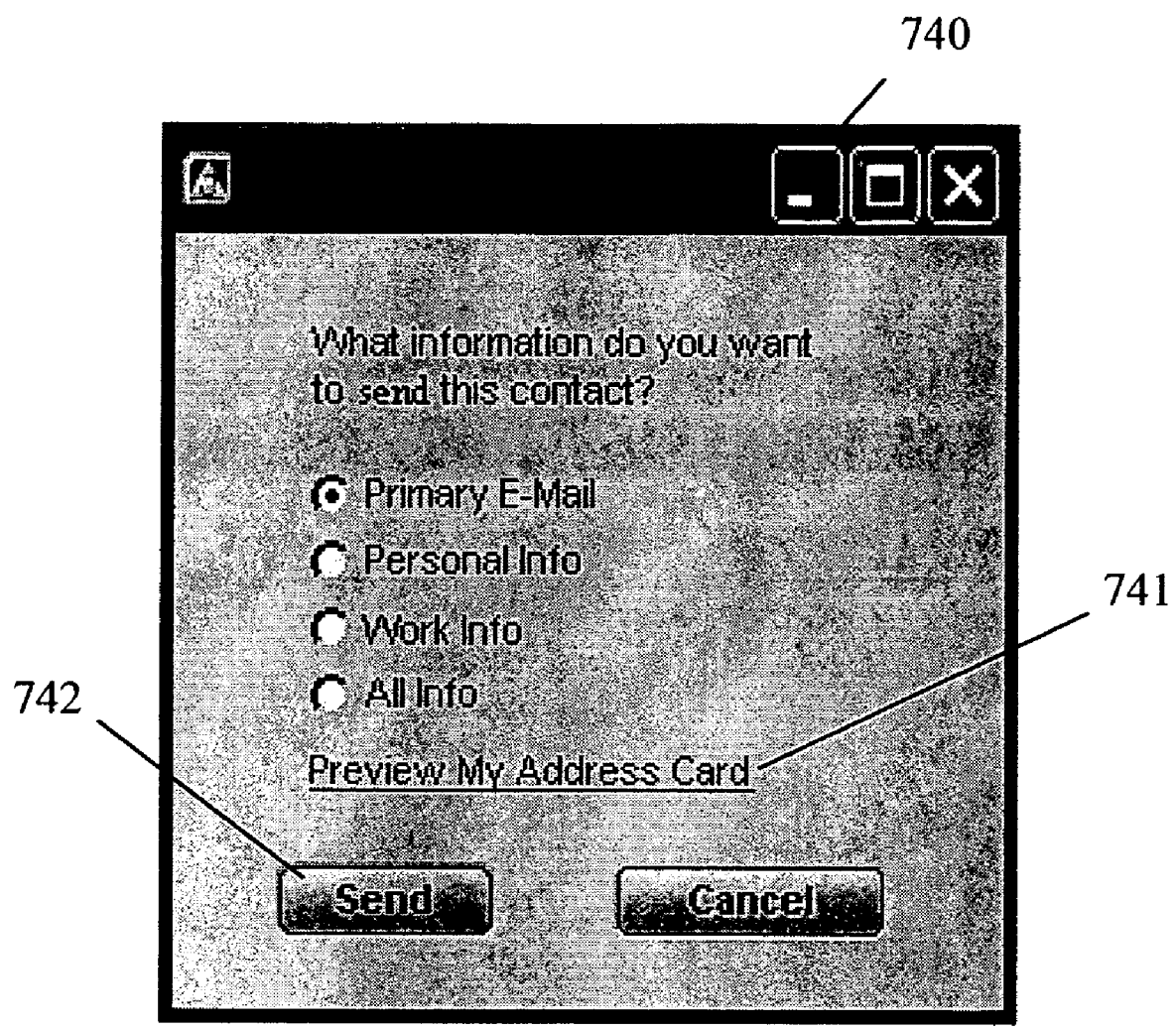
FIG. 7D is an exemplary pop-up for setting view levels.

In the screens 700a-700c, the hyperlink "Send My address card to this Contact" 701 takes the user to a "What Info do You Want to Share" screen 740 as shown in FIG. 7D. The hyperlink 701 only appears after the user has entered either a Screen Name or E-mail address and clicked "Save" button 702, which takes the user back to the address book as shown in FIG. 5L. In FIG. 7D, the default is always the same as the level of information being received. For example, if the user A shares "Work Information" with user B, the default for this screen is the "Work Information". The preview link 741 opens the view screen 600a as shown in FIG. 6A.

Figure 7E:
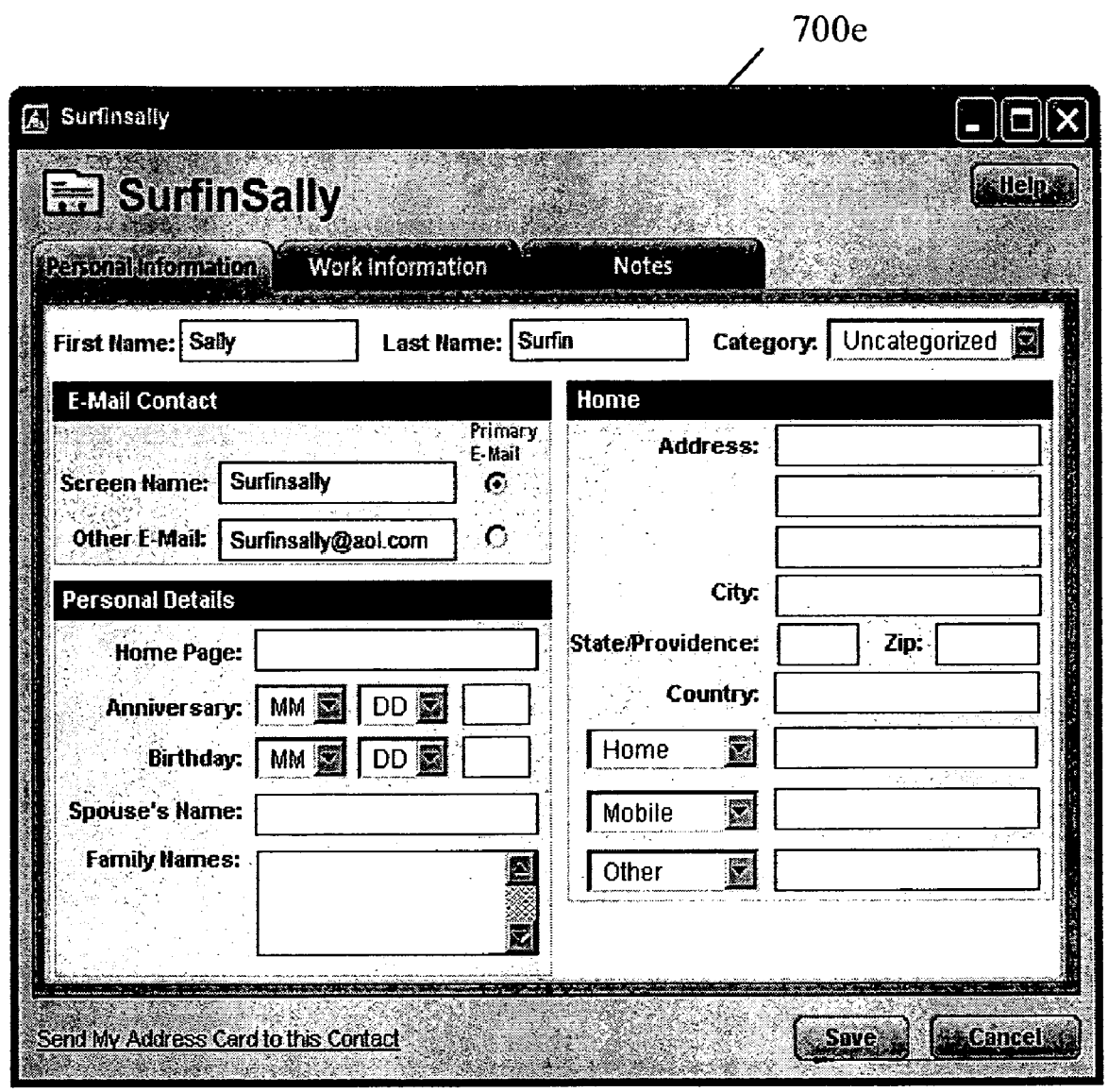
FIG. 7E is an exemplary edit contact screen with the "Personal Information" tab at the front.
Figure 7F:
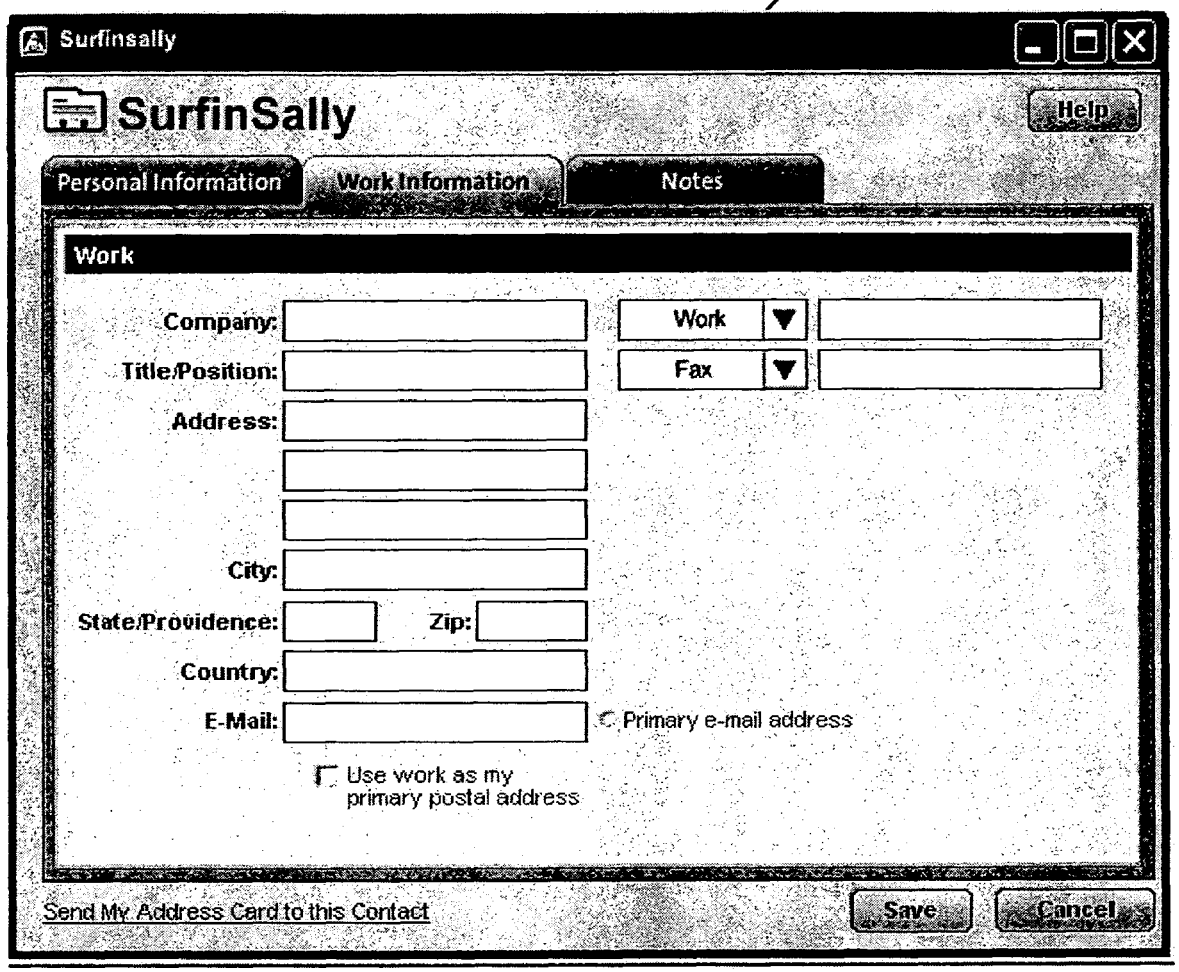
FIG. 7F is an exemplary edit contact screen with the "Work Information" tab at the front.
Figure 7G:
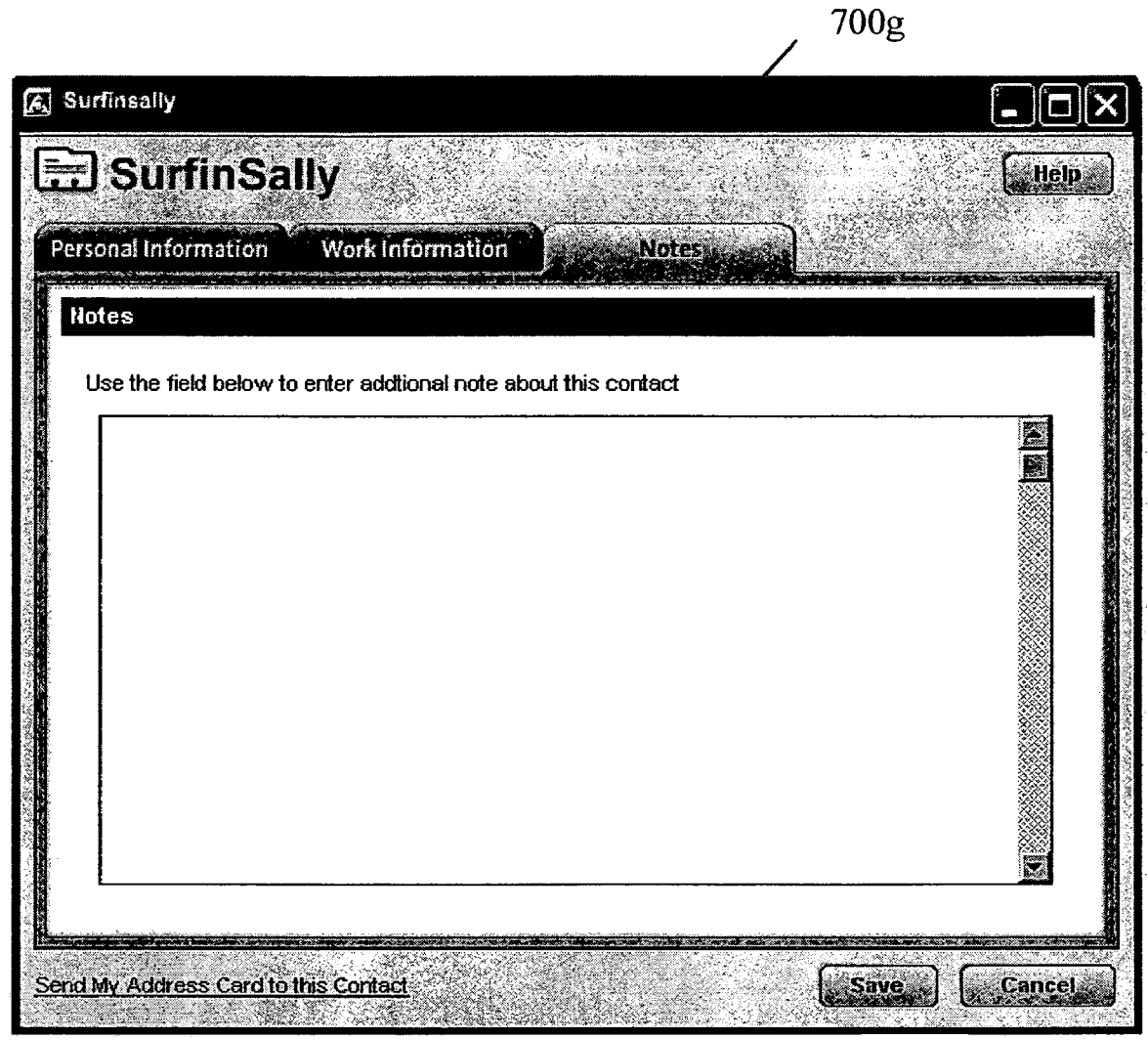
FIG. 7G is an exemplary edit contact screen with the "Notes" tab at the front.

Now referring back to FIG. 5L again, where the user highlights a screen name and then clicks the "Edit" button 593, which takes the user to the updating screen as shown in FIGS. 7E, 7F and 7G. The buttons and hyperlink have the same function as those in FIGS. 7A, 7B and 7C.

Figure 8A:
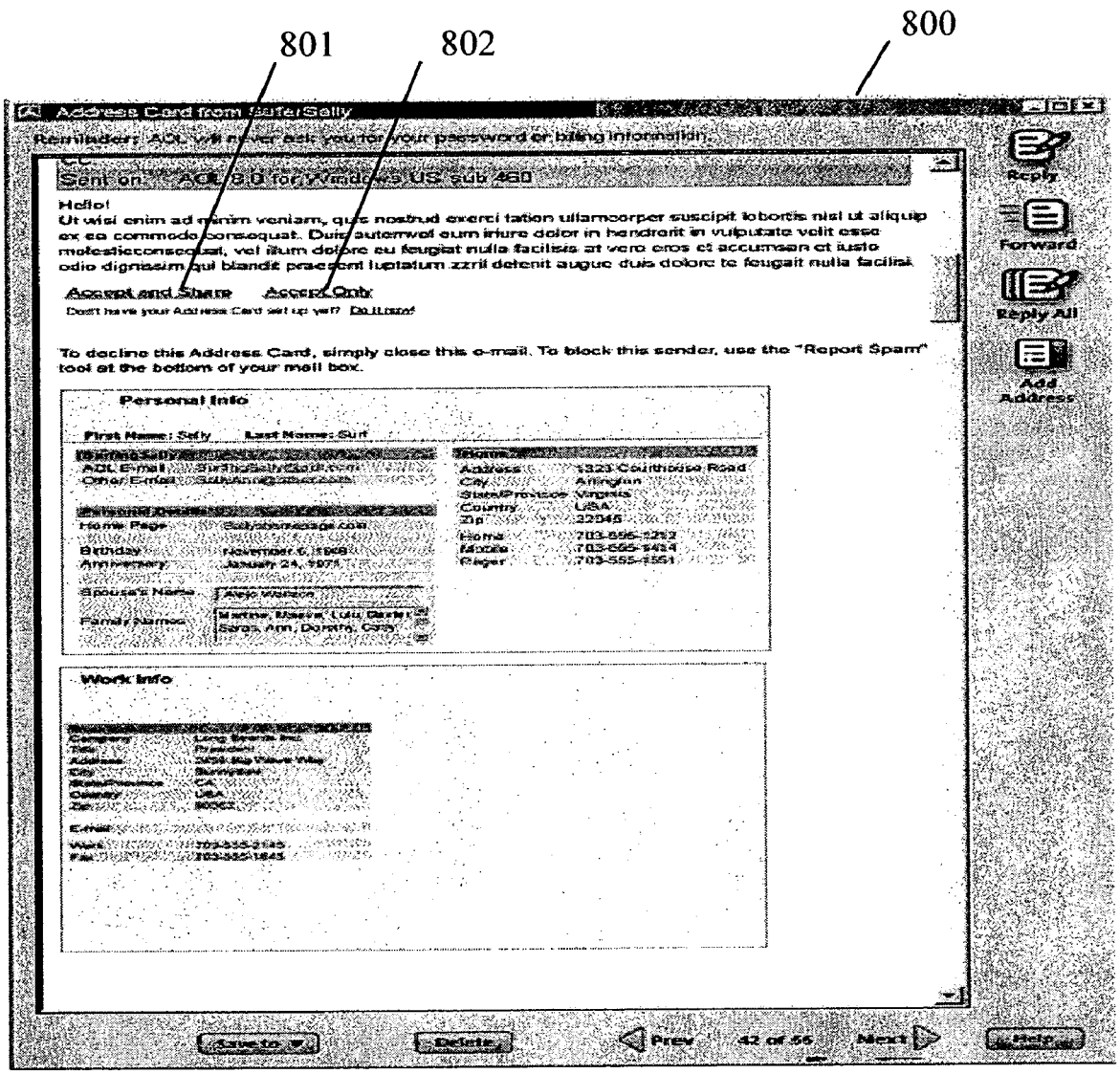
FIG. 8A is a schematic screen showing an exemplary address card received in e-mail by a member which was sent by the sender of the address card illustrated in FIGS. 7A-7D.
Figure 8B:
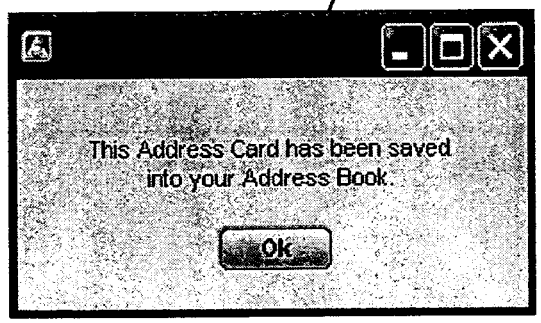
FIG. 8B is an exemplary receive accept pop-up.

FIG. 8A is a schematic screen showing an exemplary address card received in e-mail by a member which was sent by the sender of the address card illustrated in FIGS. 7A, 7B and 7C. The screen 800 includes a hyperlink 801 which invokes the "What Information do You Want to Share" screen 740 as shown in FIG. 7D. The screen also includes a hyperlink 802 which invokes the "address card Added to address book" tab 810 as shown in FIG. 8B.

Figure 9A:
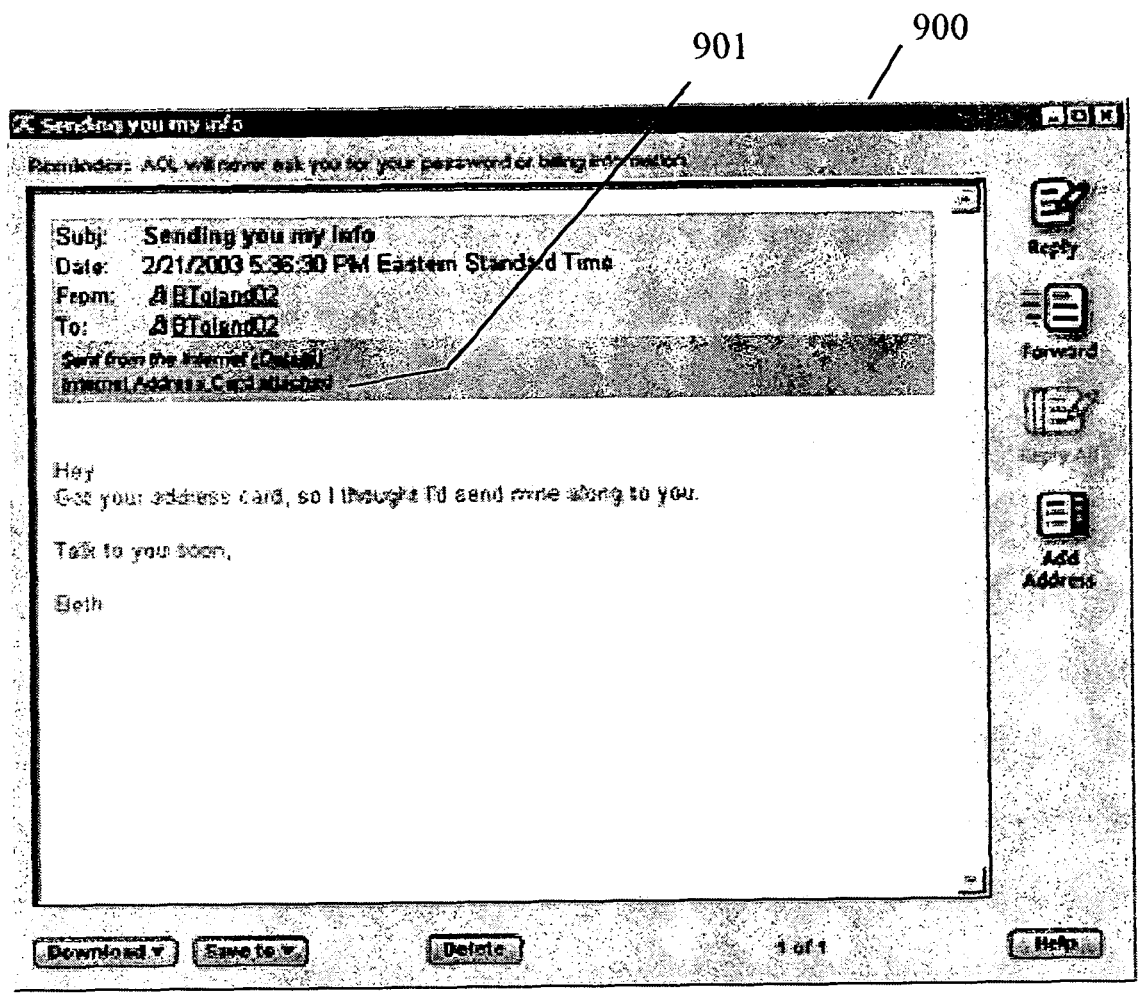
FIG. 9A is an exemplary e-mail receive screen with "Internet address card(s)" attachment link.
Figure 9B:
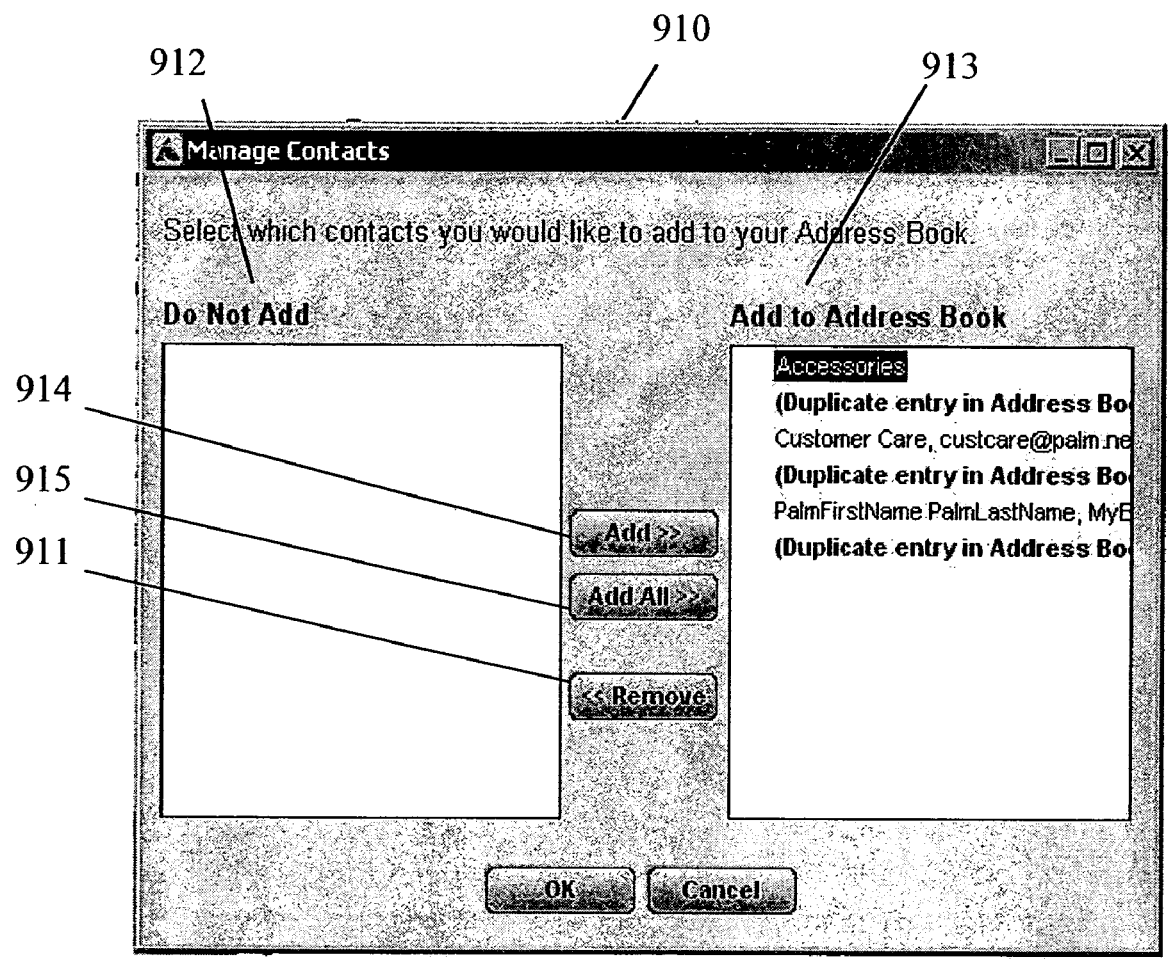
FIG. 9B is an exemplary option screen for the e-mail recipient to select the contacts he wants to add to his address book.

When the recipient of the e-mail screen 800 clicks the "accept and share" link 801, and, if he chooses to share his "Personal Information" or "Work Information" and clicks "Send" button 742, the sender of the e-mail screen 800 (i.e. the publisher who sends his address card initially) will receive an e-mail as illustrated in FIG. 9A. The e-mail screen 900 includes an "Internet address card(s)" attachment link 901, which invokes an option screen 910 as shown in FIG. 9B for the e-mail recipient to select the contacts he wants to add to his address book. If only one address card is attached, when the link 901 is clicked, the attached card is automatically added to the recipient's address book and a non-editable receive view is invoked.

Figure 9C:
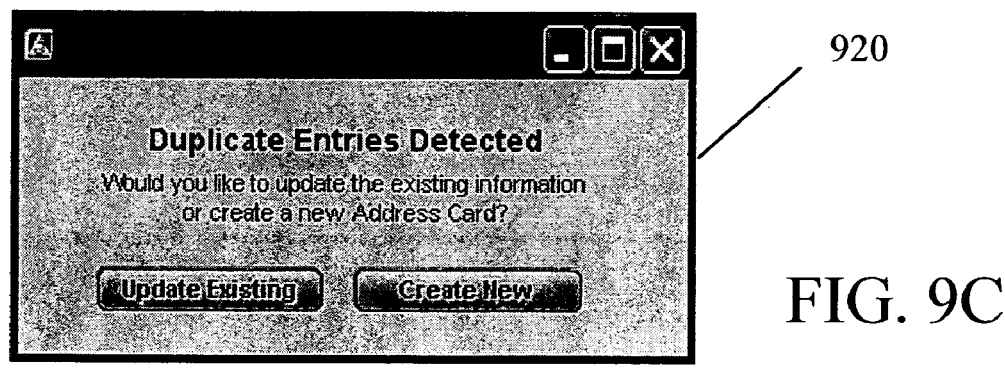
FIG. 9C is an exemplary pop-up for deleting a duplicate entry.

Now referring to FIG. 9B, the "Remove" button 911 removes the highlighted name from "Add to address book" list 912 and puts it back into the "Do Not Add" list 913. The "Add" button 914 adds the highlighted name to the list 912. The "Add All" button 915 adds all names in the list 913 to the list 912. If a duplicate entry is detected then a "Duplicate Message" pop-up 920 is invoked as shown in FIG. 9C, whereby the user can choose to update the existing information or create a new address card.

Terminology:
  Address book—a host-based data base associated with a registered user's account in a Web service, containing the data, such as the names and e-mail addresses, of the user's contacts.
  Member—a registered user who has an account with a Web service.
  "My Community"—A group of peer members of a Web service associated with a publishing member based on a publishing-subscribing relationship. "My Community" can be represented by an icon, a hyperlink, a folder or what ever wherein the community members are further organized into different groups based on categorized sharing relationships.
  Member of "My Community"/community member—a registered user who has been designated by another registered user as a member of the latter's "My Community". The former is called "subscriber" and the latter is called publisher because the former subscribes one or more digital resources from the latter based on predefined sharing relationships. Both the subscriber and the publisher, in most circumstances, are registered users of the same Web service.
  Publisher—a registered user who publishes one or more digital resources to others.
  Subscriber—any registered user, other than the publisher, who may subscribe or has subscribed one or more digital resources from the publisher.
  Non-subscriber user—a user who has not yet been registered with the Web service. A non-subscriber user may send a request to a registered user/publisher for subscription of a shared resource and may establish a limited sharing relationship with the publisher.
  Resource—Anything which can be shared by users through Internet access.
  Views—Different versions of a resource. Information contained in different views is at least partially different.

Although the invention is described herein with reference to the preferred embodiment, one skilled in the art will readily appreciate that other applications may be substituted for those set forth herein without departing from the spirit and scope of the present invention.

Accordingly, the invention should only be limited by the Claims included below.

The invention claimed is:

1. In an Internet based network with a plurality of registered users, wherein each of said users is either or both of a publisher to publish his information to others and a subscriber to subscribe shared information from others, a computer readable storage medium encoded with instructions, which when loaded into a digital computational device establishes a system for sharing digital resources based on a publishing-subscribing model, comprising:

means for designating a subscriber as a member of a publisher's community;

means for creating groups within said publisher's community, each of said groups being based on a predefined sharing relationship between said publisher and the community members of said group;

means for defining a period of time after which a publish offer lapses;

at least one publisher-agent on behalf of said publisher to serve as a gateway for all of said publisher's software applications to send out announcements and process all requests from subscribers and non-subscriber users;

means for processing a non-subscriber user's request for sharing;

means for establishing a limited sharing relationship between a subscriber user and a non-subscriber user;

at least one subscriber-agent on behalf of a community member of said publisher to serve as a gateway for all of said community member's software applications to process requests from said publisher and other subscribers; and means for delivering different views of a resource to different groups based on different sharing relationships;

wherein whenever said resource is modified by said publisher any local copy of said resource accessible by any member of said publisher's community is automatically updated;

wherein a subscriber of said resource can edit published information in a local copy of said resource, said edited published information being overwritten by any update published by said publisher; and wherein each of said views has metadata describing sharing styles, as well as version, creation date and size, wherein each sharing style corresponds to a specific sharing relationship of the publisher.

2. The computer readable storage medium of claim 1, wherein each member of said publisher's community belongs to any of:

one of said groups;
more than one of said groups; and
none of said groups.

3. The computer readable storage medium of claim 1, wherein said sharing relationships are based on any of:

a privilege to receive a copy of said resource from said publisher;
a privilege to read said resource in a central repository; and
a privilege to update said resource.

4. The computer readable storage medium of claim 1, wherein said means for creating groups further comprises:

means for announcing availability of a view or views of said resource to one or more subscribers who have not yet subscribed to access said view or views;

means for processing any subscriber's request to join any of said groups; and means for terminating a subscriber or a non-subscriber user from any of said sharing relationships.

5. The computer readable storage medium of claim 4, wherein said means for processing a non-subscriber user's request comprises an authorization for any of:

one-time sharing;
ongoing sharing;
reject; and
ignore.

6. The computer readable storage medium of claim 4, wherein said means for processing a subscriber's request further comprises:

means for automatically approving said subscriber's request.

7. The computer readable storage medium of claim 1, wherein said at least one publisher-agent automatically generates responses according to said publisher's preferences.

8. The computer readable storage medium of claim 1, wherein said at least one subscriber-agent automatically generates responses according to said community member's preferences.

9. The computer readable storage medium of claim 1, further comprising a spam control mechanism, said mechanism comprising:

rate limiting policies;
rate limiting notification to a unique receiver;
restriction on number of publishes that can be made in a single transaction; and
restriction on notification messages.

10. A method for sharing digital resources through an Internet based network which has a plurality of registered users, wherein each of said users is either or both of a publisher to publish his information to others and a subscriber to subscribe shared information from others, said method comprising the steps of:

a publisher creating one or more views of a resource;

designating a subscriber as a member of said publisher's community;

defining a period of time after which a publish offer lapses;

creating groups within said publisher's community, each group being based on a predefined sharing relationship between said publisher and the community members of said each group;

processing a non-subscriber user's request for sharing;

establishing a limited sharing relationship between a subscriber user and a non-subscriber user;

announcing availability of one or more views of said resource to one or more subscribers of said network;

designating a subscriber who subscribes one or more views of said resource to one or more of said groups;

using at least one publisher-agent on behalf of said publisher to serve as a gateway for all of said publisher's software applications to send out announcements and process all requests from subscribers and non-subscriber users;

using at least one subscriber-agent on behalf of a community member of said publisher to serve as a gateway for all of said community member's software applications to process requests from said publisher and other subscribers;

delivering different views of said resource to one or more of said groups based on different sharing relationships;

whenever said resource is modified by said publisher, automatically updating any local copy of said resource accessible by any member of said publisher's community;

wherein a subscriber of said resource can edit published information in a local copy of said resource, said edited published information being overwritten by any published by said publisher; and wherein each of said views has metadata describing sharing styles, as well as version, creation date and size, wherein each sharing style corresponds to a specific sharing relationship of the publisher.

11. The method of claim 10, wherein each member of said publisher's community belongs to any of:
  one of said groups;
  more than one of said groups; and
  none of said groups.

12. The method of claim 10, wherein said sharing relationships are based on any of:
  a privilege to receive a copy of said resource from said publisher;
  a privilege to read said resource in a central repository; and
  a privilege to update said resource.

13. The method of claim 10, wherein said step for making groups further comprises the steps of:
  processing a subscriber's request to join any of said groups; and
  terminating a subscriber or non-subscriber user from any of said sharing relationships.

14. The method of claim 13, wherein said step for processing a non-subscriber user's request comprises a step to allow said non-subscriber user for any of:
  one-time sharing; and
  ongoing sharing.

15. The method of claim 14, further comprising the steps of:
  keeping said non-subscriber user's request as pending;
  rejecting said non-subscriber user's request;
  notifying said non-subscriber user the status of his request.

16. The method of claim 13, wherein said step for processing a subscriber's request comprises a step to allow said subscriber for any of:
  one-time sharing; and
  ongoing sharing.

17. The method of claim 16, further comprising the steps of:
  automatically approving said subscriber's request;
  notifying said subscriber the status of his request.

18. The method of claim 10, wherein said at least one publisher-agent automatically generates responses according to said publisher's preferences.

19. The method of claim 10, wherein said at least one subscriber-agent automatically generates responses according to said community member's preferences.

20. The method of claim 10, further comprising a spam control step to set any of:
  rate limiting policies;
  rate limiting notification to a unique receiver;
  restriction on number of publishes that can be made in a single transaction; and
  restriction on notification messages.

21. In an Internet based network with a plurality of registered users, wherein each of said users is either or both of a publisher to publish his information to others and a subscriber to subscribe shared information from others, a computer readable storage medium encoded with instructions, which when loaded into a digital computational device establishes a system for hosting an address card service comprising:
  means for a publisher to set up an address card having multiple views, each of said views being associated with a different label which, when being clicked, brings said associated view to the front of screen;
  means for managing said address card, whereby said publisher designates a sharing relationship to one or more groups of subscribers;
  means for defining a period of time after which a publish offer lapses;
  means for publishing said address card to a number of selected subscribers based on different sharing relationships; and
  means for updating local copies of said address card possessed by said subscribers;
  wherein a subscriber of said publisher's address card can edit published information in a local copy of said address card, said edited published information being overwritten by any update published by said publisher based on an on-going subscription;
  wherein when said publisher chooses to publish to a recipient who is not a registered member of said Internet based network, a notification along with an image of said publisher's address card is sent to said recipient via e-mail, said notification comprising a first link which enables said recipient to subscribe future modifications of said publisher's address; and
  wherein each of said views has metadata describing sharing styles, as well as version, creation date and size, wherein each sharing style corresponds to a specific sharing relationship of the publisher.

22. The computer readable storage medium of claim 21, wherein said address card comprises a page for centrally entering said publisher's contact information, and wherein any of said entered contact information is automatically populated to one or more of said views.

23. The computer readable storage medium of claim 22, wherein one of said views is designated as a default view.

24. The computer readable storage medium of claim 21, wherein each of said views can be published separately or in combination with other one or more of said views.

25. The computer readable storage medium of claim 21, wherein each of said views is based on a template containing a set of predefined fields.

26. The computer readable storage medium of claim 21, wherein one or more of said views can be customized.

27. The computer readable storage medium of claim 21, wherein said means for setting up an address card further comprising:
  a virtual button whereby said publisher sets his preferences; and
  a virtual button whereby said publisher accesses help information.

28. The computer readable storage medium of claim 21, wherein means for managing said address card further comprising:
  a virtual button whereby said publisher sets his preferences;
  a virtual button whereby said publisher accesses help information;
  a dropdown menu showing all categories of contacts in said publisher's address book;
  a look up window for searching a subscriber by name;
  a virtual button for adding a new contact;
  a virtual button for editing said publisher's address card; and
  a preview hyperlink for each view of said address card, said preview hyperlink linking to a list of subscribers selected for accepting said view.

29. The computer readable storage medium of claim 28, further comprising:

means for adding said publisher's self-expression elements into said address card.

30. The computer readable storage medium of claim 28, further comprising:
means for setting parental control to prevent children from handling said address card.

31. The computer readable storage medium of claim 21, wherein said publisher can view any of:
an accepted subscription;
a rejected subscription; and
a pending subscription.

32. The computer readable storage medium of claim 31, wherein said publisher can un-publish to any of said subscribers.

33. The computer readable storage medium of claim 21, wherein said means for publishing is any of:
an e-mail;
an immediate popup from an instant messaging system;
an indicator in an online address book; and
a popup at sign-on.

34. The computer readable storage medium of claim 21, wherein any of said subscribers receiving a publish offer may take any action of:
rejecting said offer;
accepting said offer by subscribing said publisher's address card; and
accepting said offer by subscribing said publisher's address card and at the same time reciprocating with a publication of said subscriber's address card to said publisher.

35. The computer readable storage medium of claim 34, wherein a recipient of a publish offer may choose from preferences to automatically subscribe any address, card being offered.

36. The computer readable storage medium of claim 21, wherein said notification comprises a second link which enables said recipient to reciprocate said publisher with contact information.

37. The computer readable storage medium of claim 21, wherein said means for updating further comprising:
means for displaying said address card with all data fields editable so that said publisher modifies part or all of entered contact information;
a virtual button, by clicking which said publisher is prompted to a confirmation screen wherein said publisher decides whether or not to update said address card in said selected subscribers based on different sharing relationships; and
a hyperlink which takes said publisher to a screen where said publisher can reset groups, sharing relationships and views of said address card.

38. The computer readable storage medium of claim 37, wherein said publisher can choose whether a modification on said publisher's address card triggers a notification to said selected subscribers.

39. The computer readable storage medium of claim 38, wherein said notification comprises details of changes made to said publisher's address card.

40. The computer readable storage medium of claim 21, wherein said address card is incorporated into said publisher's address book from which said selected subscribers' e-mail addresses are extracted.

41. The computer readable storage medium of claim 40, wherein said address book comprises a virtual button, by selecting a screen name from said address book and then clicking said virtual button, said publisher is prompted to a screen of an editable address card where said publisher completes the contact information of a new contact associated with said selected screen name.

42. The computer readable storage medium of claim 41, wherein when said publisher publishes to a recipient not in said publisher's address book, said recipient's e-mail address is automatically added into said publisher's address book.

43. The computer readable storage medium of claim 41, wherein when said publisher deletes any of said subscribers from said publisher's address book, said deleted subscriber's subscription to said publisher's address card is terminated.

44. The computer readable storage medium of claim 43, wherein when a subscriber of said publisher's address card chooses to delete said publisher's address card, said subscriber's subscription to said publisher's address card is terminated.

45. The computer readable storage medium of claim 41, wherein said screen of an editable address card comprises:
a drop down menu for setting a group for said new contact;
a save button for saving entered data; and
a hyperlink which takes said publisher to a screen for designating which view of said publisher's address card to be shared with said new contact.

46. The computer readable storage medium of claim 41, further comprising a screen wherein said publisher can add a subscriber of said address card into said address book or remove a subscriber of said address card from said address book.

47. The computer readable storage medium of claim 46, wherein any registered user of said network who receives a copy of said publisher's address card in an e-mail can save said address card into said any registered user's address book by clicking an accept link embedded in said e-mail.

48. The computer readable storage medium of claim 46, wherein any registered user of said network who receives a copy of said publisher's address card in an e-mail can save said address card into said any registered user's address book and at the same time share his own address card with said publisher by clicking an accept and share link embedded in said e-mail.

49. The computer readable storage medium of claim 40, wherein said publisher may choose from preferences to automatically publish said publisher's default address card by sending a publish offer to anyone included in said publisher's address book.

50. The computer readable storage medium of claim 40, wherein information in said publisher's address card is accessible from a current subscriber's address book either online or offline.

51. The computer readable storage medium of claim 40, wherein separately subscribed views of said publisher's address card are merged as a single entry in a subscriber's address book.

52. The computer readable storage medium of claim 40, further comprising:
means for detecting a duplicate entry of said publisher's screen name in a subscriber's address book;
wherein when said duplicate entry is detected, said subscriber can choose to overwrite said duplicate entry with said publisher's address card or keep said publisher's address card as a separate entry.

53. The computer readable storage medium of claim 40, wherein when a subscriber forwards said publisher's address card to a third party, a one-time copy of said publisher's address card is added to said third party's address book if said third party chooses to accept.

54. The computer readable storage medium of claim 53, wherein said publisher can set a parameter on said address card, preventing a subscriber from forwarding said address card.

55. The computer readable storage medium of claim 21, wherein a subscriber of said publisher's address card can choose to un-subscribe at any time.

56. A method for providing a digital address card service through an Internet based network which has a plurality of registered users, wherein each of said users is either or both of a publisher to publish his information to others and a subscriber to subscribe a published address card from others, said method comprising the steps of:
  a publisher configuring an address card, said address card having multiple views, each of said views being associated with a different label which, when being clicked, brings said associated view to the front of screen;
  designating a sharing relationship to one or more groups of subscribers;
  defining a period of time after which a publish offer lapses; and
  publishing said address card to a number of selected subscribers based on designated sharing relationships;
  wherein a subscriber of said publisher's address card can edit published information in a local copy of said address card, said edited published information being overwritten by any update published by said publisher based on an on-going subscription;
  wherein when said publisher chooses to publish to a recipient who is not a registered member of said Internet based network, sending a notification along with an image of said publisher's address card to said recipient via e-mail, said notification comprising a first link which enables said recipient to subscribe future modifications of said publisher's address and
  wherein each of said views has metadata describing sharing styles, as well as version, creation date and size, wherein each sharing style corresponds to a specific sharing relationship of the publisher.

57. The method of claim 56, wherein said step of configuring further comprises the step of:
  entering said publisher's contact information from a central entry page;
  wherein any of said entered contact information is automatically populated to one or more of said views.

58. The method of claim 57, further comprising the step of:
  designating one of said views as a default view.

59. The method of claim 56, wherein each of said views can be published separately or in combination with any other one or more of said views.

60. The method of claim 56, wherein each of said views is based on a template containing a set of predefined fields.

61. The method of claim 56, wherein said step for configuring comprises the step of:
  customizing one or more of said views.

62. The method of claim 56, wherein said step for configuring further comprises the step of:
  setting preferences.

63. The method of claim 56, wherein said step for configuring further comprising the step of:
  adding said publisher's self-expression elements into said address card.

64. The method of claim 56, wherein said step for configuring further comprising the step of:
  setting parental control to prevent children from handling said address card.

65. The method of claim 56, wherein said publisher can view any of:
  an accepted subscription;
  a rejected subscription; and
  a pending subscription.

66. The method of claim 65, further comprising the step of:
  un-publishing to one or more of said subscribers.

67. The method of claim 56, wherein said step for publishing is any of:
  sending a pre-populated e-mail;
  invoking an immediate popup from an instant messaging system;
  highlighting an indicator in an online address book; and
  invoking a popup at sign-on.

68. The method of claim 56, wherein any of said subscribers who receive a publish offer may take any action of:
  rejecting said offer;
  accepting said offer by subscribing said publisher's address card; and
  accepting said offer by subscribing said publisher's address card and at the same time reciprocating with a publication of said subscriber's address card to said publisher.

69. The method of claim 68, wherein a recipient of a publish offer may choose from preferences to automatically subscribe any address card being offered.

70. The method of claim 56, wherein said notification comprises a second link which enables said recipient to reciprocate said publisher with contact information.

71. The method of claim 56, wherein said step for configuring further comprises the steps of:
  modifying said address card; and
  configuring update policies.

72. The method of claim 71, wherein said step for configuring update policies further comprises the step of:
  choosing whether a modification on said publisher's address card triggers a notification to said selected subscribers.

73. The method of claim 72, wherein said notification comprises details of changes made to said publisher's address card.

74. The method of claim 56, wherein said address card is incorporated into said publisher's address book from which said selected subscribers' e-mail addresses are extracted, and wherein said address book comprises a virtual button, by selecting a screen name from said address book and then clicking said virtual button, said publisher is prompted to a screen of an editable address card where said publisher completes the contact information of a new contact associated with said selected screen name.

75. The method of claim 74, wherein when said publisher publishes to a recipient not in said publisher's address book, said recipient's e-mail address is automatically added into said publisher's address book.

76. The method of claim 74, wherein when said publisher deletes any of said subscribers from said publisher's address book, said deleted subscriber's subscription to said publisher's address card is terminated.

77. The method of claim 76, wherein when a subscriber of said publisher's address card chooses to delete said publisher's address card, said subscriber's subscription to said publisher's address card is terminated.

78. The method of claim 74, wherein said screen of an editable address card comprises:
  a drop down menu for setting a group for said new contact;
  a save button for saving entered data; and a hyperlink which takes said publisher to a screen for designating which view of said publisher's address card to be shared with said new contact.

79. The method of claim 74, further comprising the steps of:
adding one or more subscribers of said address card into said address book; and
removing one or more subscribers of said address card from said address book.

80. The method of claim 79, wherein any registered user of said network who receives a copy of said publisher's address card in an e-mail can save said address card into said any registered user's address book by clicking an accept link embedded in said e-mail.

81. The method of claim 79, wherein any registered user of said network who receives a copy of said publisher's address card in an e-mail can save said address card into said any registered user's address book and at the same time share his own address card with said publisher by clicking an accept and share link embedded in said e-mail.

82. The method of claim 74, further comprising the step of:
choosing from preferences to automatically publish said publisher's default address card by sending a publish offer to anyone included in said publisher's address book.

83. The method of claim 74, wherein information in said publisher's address card is accessible from a current subscriber's address book either online or offline.

84. The methods of claim 74, wherein separately subscribed views of said publisher's address card are merged as a single entry in a subscriber's address book.

85. The method of claim 74, further comprising the step of:
detecting a duplicate entry of said publisher's screen name in a subscriber's address book;
wherein when said duplicate entry is detected, said subscriber can choose to overwrite said duplicate entry with said publisher's address card or keep said publisher's address card as a separate entry.

86. The method of claim 74, wherein when a subscriber forwards said publisher's address card to a third party, a one-time copy of said publisher's address card is added to said third party's address book upon said third party's acceptance.

87. The method of claim 86, wherein said step for configuring further comprising the step of:
setting a parameter on said address card for preventing a subscriber from forwarding said address card.

88. The method of claim 56, wherein a subscriber of said publisher's address card can choose to un-subscribe at any time.

89. A method for providing a digital address card service through an Internet based network which has a plurality of registered users, wherein each of said users is either or both of a publisher to publish his information to others and a subscriber to subscribe a published address card from others, said method comprising the steps of:
a publisher configuring an address card, said address card having multiple views, each of said views being associated with a different label which, when being clicked, brings said associated view to the front of screen, wherein each of said views has metadata describing sharing-styles, as well as version, creation date and size;
wherein configuring said address card comprises entering said publisher's contact information from a central entry page, wherein any of said entered contact information is automatically populated to one or more of said views, wherein each of said views is based on a template containing a set of predefined fields, customizing one or more of said views, setting preferences, adding said publisher's self-expression elements into said address card, setting parental control to prevent children from handling said address card, modifying said address card, configuring update policies;
wherein said address card is incorporated into said publisher's address book from which said selected subscribers' e-mail addresses are extracted, and wherein said address book comprises a virtual button, by selecting a screen name from said address book and then clicking said virtual button, said publisher is prompted to a screen of an editable address card where said publisher completes the contact information of a new contact associated with said selected screen name;
designating one of said views as a default view;
designating a sharing relationship to one or more groups of subscribers, wherein each of said sharing styles corresponds to a specific sharing relationship of the publisher;
defining a period of time after which a publish offer lapses;
publishing said address card to a number of selected subscribers based on designated sharing relationships by any of sending a pre-populated email, invoking an immediate popup from an instant messaging system, highlighting an indicator in an online address book and invoking a popup at sign-on;
wherein a subscriber of said publisher's address card can edit published information in a local copy of said address card, said edited published information being overwritten by any update published by said publisher based on an on-going subscription;
wherein any of said subscribers who receive a publish offer may take any action of rejecting said offer, accepting said offer by subscribing said publisher's address card and accepting said offer by subscribing said publisher's address card and at the same time reciprocating with a publication of said subscriber's address card to said publisher; and wherein a subscriber of said publisher's address card can choose to un-subscribe at any time;
viewing by said publisher any of an accepted subscription, a rejected subscription and a pending subscription;
wherein when said publisher chooses to publish to a recipient who is not a registered member of said Internet based network, sending a notification along with an image of said publisher's address card to said recipient via e-mail, said notification comprising a first link which enables said recipient to subscribe future modifications of said publisher's address card, wherein said notification comprises a second link which enables said recipient to reciprocate said publisher with contact information.

* * * * *